(12) United States Patent
Jeon et al.

(10) Patent No.: US 11,420,653 B2
(45) Date of Patent: Aug. 23, 2022

(54) AUTONOMOUS DRIVING APPARATUS AND METHOD

(71) Applicant: HYUNDAI MOBIS Co., Ltd., Seoul (KR)

(72) Inventors: Byeong Hwan Jeon, Yongin-si (KR); Hyuk Lee, Yongin-si (KR); Jun Han Lee, Yongin-si (KR); Soon Jong Jin, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 109 days.

(21) Appl. No.: 15/930,357

(22) Filed: May 12, 2020

(65) Prior Publication Data
US 2020/0369294 A1    Nov. 26, 2020

(30) Foreign Application Priority Data

May 20, 2019   (KR) .................. 10-2019-0058613
May 20, 2019   (KR) .................. 10-2019-0058614
May 20, 2019   (KR) .................. 10-2019-0058615

(51) Int. Cl.
*B60W 50/14*    (2020.01)
*B60W 60/00*    (2020.01)

(52) U.S. Cl.
CPC ........ *B60W 60/0016* (2020.02); *B60W 50/14* (2013.01); *B60W 60/0059* (2020.02);
(Continued)

(58) Field of Classification Search
CPC ........ G08G 1/017; G08G 1/056; G08G 1/065; G08G 1/14; G08G 1/20; G08G 5/0043;
(Continued)

(56) References Cited

U.S. PATENT DOCUMENTS 10,435,035 B2 *  10/2019  Wiegand ............... B60K 35/00
10,663,575 B2 *   5/2020  Watanabe ............. G01S 13/865
(Continued)

FOREIGN PATENT DOCUMENTS

KR    10-1998-0068399    12/1998

OTHER PUBLICATIONS

Nanri, Travel assistance method for travel assistance device, and travel assistance device (English), (Nov. 29, 2018), WIPO, WO 2018/216125 A1 (Year: 2018).*
(Continued)

*Primary Examiner* — James J Lee
*Assistant Examiner* — Matthew L Parulski
(74) *Attorney, Agent, or Firm* — H.C. Park & Associates, PLC

(57) ABSTRACT

An autonomous driving apparatus and method, in which the apparatus includes a sensor unit detecting a surrounding vehicle around an ego vehicle that autonomously travels, an output unit, a memory storing map information, and a processor controlling the autonomous driving of the ego vehicle based on the map information. The processor is configured to generate an actual driving trajectory and expected driving trajectory of the surrounding vehicle based on driving information of the surrounding vehicle detected by the sensor unit and the map information, determine whether a driving mode of the surrounding vehicle is an autonomous driving mode and an autonomous driving risk of the ego vehicle based on a trajectory error between the actual driving trajectory and expected driving trajectory of the surrounding vehicle, and output a warning to a passenger through the output unit at a level corresponding to the determined autonomous driving risk.

6 Claims, 10 Drawing Sheets

(52) U.S. Cl.
CPC ... *B60W 60/00274* (2020.02); *B60W 2420/42* (2013.01); *B60W 2420/52* (2013.01); *B60W 2554/4044* (2020.02); *B60W 2554/4049* (2020.02)

(58) Field of Classification Search
CPC ...... B60W 10/06; B60W 10/08; B60W 10/26; B60W 20/12; B60W 20/13; B60W 2040/1315; B60W 2050/0008; B60W 2050/0024; B60W 2050/0075; B60W 2300/14; B60W 2510/244; B60W 2520/10; B60W 2552/15; B60W 2556/10; B60W 2556/50; B60W 2900/00; B60W 30/182; B60W 40/13

See application file for complete search history.

(56) References Cited

U.S. PATENT DOCUMENTS

| | | | | |
|---|---|---|---|---|
| 2004/0260433 | A1* | 12/2004 | Sawada | B60Q 9/008 701/1 |
| 2016/0035220 | A1* | 2/2016 | Paromtchik | G08G 1/0125 701/117 |
| 2019/0016339 | A1* | 1/2019 | Ishioka | G05D 1/0223 |

OTHER PUBLICATIONS

Nishi, Driving assistance device (English),(Dec. 6, 2017), JPO, JP 6241531 B2 (Year: 2017).*

* cited by examiner

AUTONOMOUS DRIVING APPARATUS AND METHOD

CROSS-REFERENCE TO RELATED APPLICATIONS

This application claims priority from and the benefit of Korean Patent Application Nos. 10-2019-0058614, 10-2019-0058613, and 10-2019-0058615, filed on May 20, 2019, which are hereby incorporated by reference for all purposes as if set forth herein.

BACKGROUND

Field

Exemplary embodiments of the present invention relate to an autonomous driving apparatus and method applied to an autonomous vehicle.

Discussion of the Background

Today's automobile industry is moving towards an implementation of autonomous driving to minimize the intervention of a driver in vehicle driving. An autonomous vehicle refers to a vehicle that autonomously determines a driving path by recognizing a surrounding environment using an external information detection and processing function upon driving and independently travels using its own motive power.

The autonomous vehicle can autonomously travel up to a destination while preventing a collision against an obstacle on a driving path and controlling a vehicle speed and driving direction based on a shape of a road although a driver does not manipulate a steering wheel, an acceleration pedal or a brake. For example, the autonomous vehicle may perform acceleration in a straight road, and may perform deceleration while changing a driving direction in accordance with the curvature of a curved road in the curved road.

In order to guarantee the safe driving of an autonomous vehicle, the driving of the autonomous vehicle needs to be controlled based on a measured driving environment by precisely measuring the driving environment using sensors mounted on the vehicle and continuing to monitor the driving state of the vehicle. To this end, various sensors such as a LIDAR sensor, a radar sensor, an ultrasonic sensor and a camera sensor, that is, sensors for detecting surrounding objects such as surrounding vehicles, pedestrians and fixed facilities, are applied to the autonomous vehicle. Data output by such a sensor is used to determine information on a driving environment, for example, state information such as a location, shape, moving direction and moving speed of a surrounding object.

Furthermore, the autonomous vehicle also has a function for optimally determining a driving path and driving lane by determining and correcting the location of the vehicle using previously stored map data, controlling the driving of the vehicle so that the vehicle does not deviate from the determined path and lane, and performing defense and evasion driving for a risk factor in a driving path or a vehicle that suddenly appears nearby.

Background of the Disclosure is disclosed in Korean Patent Application Laid-Open No. 10-1998-0068399 (Oct. 15, 1998).

The above information disclosed in this Background section is only for enhancement of understanding of the background of the invention and, therefore, it may contain information that does not constitute prior art.

SUMMARY

A first exemplary embodiment of the present invention provides an autonomous driving apparatus and method which can improve the driving stability and driving accuracy of an autonomous vehicle by outputting a proper warning to a passenger based on an autonomous driving risk of the autonomous vehicle and effectively handle an emergency situation, which occurs in the passenger, by controlling the driving of an ego vehicle and communication with an external organization based on a state of the passenger.

A second exemplary embodiment of the present invention provides an autonomous driving apparatus and method for improving the driving stability and driving accuracy of an autonomous vehicle by learning an autonomous driving algorithm applied to autonomous driving control by taking into consideration driving manipulation of a passenger which is involved in an autonomous driving control process for an ego vehicle.

A third exemplary embodiment of the present invention provides an autonomous driving apparatus and method capable of improving convenience of a passenger by controlling the state of a device within an ego vehicle based on an internal control mode set by the passenger in an autonomous driving process of the ego vehicle.

Additional features of the invention will be set forth in the description which follows, and in part will be apparent from the description, or may be learned by practice of the invention.

The first exemplary embodiment of the present invention provides an autonomous driving apparatus including a sensor unit configured to detect a surrounding vehicle around an ego vehicle that autonomously travels, an output unit, a memory configured to store map information, and a processor configured to control the autonomous driving of the ego vehicle based on the map information stored in the memory. The processor is configured to generate an actual driving trajectory and expected driving trajectory of the surrounding vehicle based on driving information of the surrounding vehicle detected by the sensor unit and the map information stored in the memory, determine whether a driving mode of the surrounding vehicle is an autonomous driving mode and an autonomous driving risk of the ego vehicle based on a trajectory error between the actual driving trajectory and expected driving trajectory of the surrounding vehicle, and output a warning to a passenger through the output unit at a level corresponding to the determined autonomous driving risk.

The processor may be configured to output the warnings to the passenger through the output unit as first to third levels in ascending order of autonomous driving risk of the ego vehicle.

The processor may be configured to output, to the passenger, a warning corresponding to the first level through the output unit when the driving mode of the surrounding vehicle is the autonomous driving mode and to output, to the passenger, a warning corresponding to the second level through the output unit when the driving mode of the surrounding vehicle is a manual driving mode.

The processor may be configured to perform a diagnosis of reliability of autonomous driving control over the ego vehicle based on a size of the trajectory error between the actual driving trajectory and expected driving trajectory of the surrounding vehicle or a cumulative addition of the trajectory errors and to output, to the passenger, a warning corresponding to the third level through the output unit if, as a result of the execution of the diagnosis, it is determined that the autonomous driving control over the ego vehicle is unreliable.

The processor may be configured to determine that the autonomous driving control over the ego vehicle is unreliable, when the state in which the size of the trajectory error is a preset first threshold value or more occurs within a preset first critical time.

The processor may be configured to additionally perform the diagnosis of reliability using the cumulative addition of the trajectory errors in the state in which the size of the trajectory error is less than the first threshold value for the first critical time.

The processor may be configured to determine that the autonomous driving control over the ego vehicle is unreliable, when the state in which the cumulative addition of the trajectory errors is a preset second threshold value or more occurs within a second critical time preset as a value greater than the first critical time, in the state in which the size of the trajectory error is less than the first threshold value for the first critical time.

The processor may be configured to release the warning output through the output unit when the size of the trajectory error becomes less than the first threshold value or the cumulative addition of the trajectory errors becomes less than the second threshold value after outputting the warning to the passenger through the output unit.

The sensor unit may be configured to further detect a state of a passenger within the ego vehicle. The processor may be configured to release the warning output through the output unit, when the state of the passenger detected by the sensor unit is a forward looking state after outputting the warning to the passenger through the output unit.

The first exemplary embodiment of the present invention also provides an autonomous driving method including controlling, by a processor, autonomous driving of an ego vehicle based on map information stored in a memory, generating, by the processor, an actual driving trajectory and expected driving trajectory of a surrounding vehicle around the ego vehicle based on driving information of the surrounding vehicle detected by a sensor unit and the map information stored in the memory, and determining, by the processor, whether a driving mode of the surrounding vehicle is an autonomous driving mode and an autonomous driving risk of the ego vehicle based on a trajectory error between the actual driving trajectory and expected driving trajectory of the surrounding vehicle, and outputting, by the processor, a warning to a passenger through an output unit at a level corresponding to the determined autonomous driving risk.

The second exemplary embodiment of the present invention provides an autonomous driving apparatus including a memory configured to store an autonomous driving algorithm for autonomous driving control over an ego vehicle and a processor configured to control the autonomous driving of the ego vehicle based on the autonomous driving algorithm stored in the memory. The processor is configured to determine whether driving manipulation of a passenger of the ego vehicle has been involved in a process of controlling the autonomous driving of the ego vehicle based on the autonomous driving algorithm and to allow the learning of the autonomous driving algorithm to be performed based on a result of a comparison between the driving manipulation of the passenger and a control process according to the autonomous driving algorithm at timing at which the driving manipulation of the passenger is involved, if it is determined that the driving manipulation of the passenger has been involved.

The processor may be configured to stop the autonomous driving control over the ego vehicle and enable the learning of the autonomous driving algorithm to be performed if it is determined that the driving manipulation of the passenger has been involved.

The processor may be configured to verify a risk of the driving manipulation of the passenger and then enable the learning of the autonomous driving algorithm to be performed when the control process and the driving manipulation of the passenger are different.

The autonomous driving apparatus may further include a sensor unit configured to detect a surrounding object around the ego vehicle and a driving information detector configured to detect driving information on the driving state of the ego vehicle. The processor may be configured to enable the learning of the autonomous driving algorithm to be performed based on information on the surrounding object detected by the sensor unit, the driving information of the ego vehicle detected by the driving information detector, the control process, and the driving manipulation of the passenger.

The second exemplary embodiment of the present invention provides an autonomous driving method including controlling, by a processor, the autonomous driving of an ego vehicle based on an autonomous driving algorithm stored in a memory, determining, by the processor, whether driving manipulation of a passenger of the ego vehicle has been involved in a process of controlling the autonomous driving of the ego vehicle based on the autonomous driving algorithm, and enabling, by the processor, the learning of the autonomous driving algorithm to be performed based on a result of a comparison between the driving manipulation of the passenger and a control process according to the autonomous driving algorithm at timing at which the driving manipulation of the passenger is involved, if it is determined that the driving manipulation of the passenger has been involved.

The third exemplary embodiment of the present invention provides an autonomous driving apparatus including a sensor unit configured to detect a surrounding vehicle around an ego vehicle that autonomously travels, a memory configured to store map information, an internal device installed within the ego vehicle and having a state controlled by a manipulation of the passenger of the ego vehicle to support the passenger, and a processor configured to control the autonomous driving of the ego vehicle based on the map information stored in the memory. The processor is configured to determine a driving risk of the ego vehicle based on the surrounding vehicle detected by the sensor unit and control the state of the internal device based on an in-vehicle mode set by the passenger, when the determined driving risk is less than a preset critical risk.

The processor may be configured to generate an expected driving trajectory and actual driving trajectory of the surrounding vehicle based on the map information stored in the memory and driving information of the surrounding vehicle detected by the sensor unit, update the map information stored in the memory using new map information received from a server when a trajectory error between the expected driving trajectory and actual driving trajectory of the surrounding vehicle is a preset threshold value or more, and control the autonomous driving of the ego vehicle based on the updated map information.

The processor may be configured to determine the driving risk based on the number of surrounding vehicles located within a preset first distance from the ego vehicle.

The processor may be configured to control the autonomous driving of the ego vehicle so that the ego vehicle follows the driving of a driving group located within a preset second distance from the ego vehicle and configured with a plurality of group vehicles if it is determined that the determined driving risk is the critical risk or more.

The internal device may include a vehicle seat, a lighting device, and a display device. The in-vehicle mode may include a break mode and an entertainment mode.

The processor may be configured to control one or more of the angle of the vehicle seat, the illuminance of the lighting device and the angle of the display device based on the in-vehicle mode, limit a lane change when the in-vehicle mode is the break mode or the entertainment mode, and control the autonomous driving of the ego vehicle so that the ego vehicle travels at a constant speed.

The autonomous driving apparatus may further include an output unit. The processor may be configured to output a warning to the passenger through the output unit if it is determined that the driving risk is the critical risk or more in a process of controlling the autonomous driving of the ego vehicle based on the break mode or the entertainment mode.

The sensor unit may further detect a state of the passenger. The processor may be configured to control the group driving of the ego vehicle by taking into consideration a rank of the ego vehicle in the driving group if it is determined that the state of the passenger detected by the sensor unit is an abnormal state.

If the state of the passenger is an abnormal state, the processor may be configured to assign a leader vehicle rank to a follower vehicle just behind the ego vehicle when the ego vehicle has the leader vehicle rank in the driving group and to control the autonomous driving of the ego vehicle so that the ego vehicle leaves the driving group.

If the state of the passenger is an abnormal state, the processor may be configured to control the autonomous driving of the ego vehicle so that the ego vehicle is located at the rearmost within the driving group when the ego vehicle has a follower vehicle rank in the driving group.

The third exemplary embodiment of the present invention provides an autonomous driving method including controlling, by a processor, the autonomous driving of an ego vehicle based on map information stored in a memory, determining, by the processor, a driving risk of the ego vehicle based on a surrounding vehicle detected by a sensor unit, comparing, by the processor, the determined driving risk with a preset critical risk, and controlling, by the processor, the state of an internal device based on an in-vehicle mode set by a passenger of the ego vehicle if it is determined that the driving risk is smaller than the critical risk. The internal device is installed within the ego vehicle and has a state controlled by a manipulation of the passenger to support the passenger.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
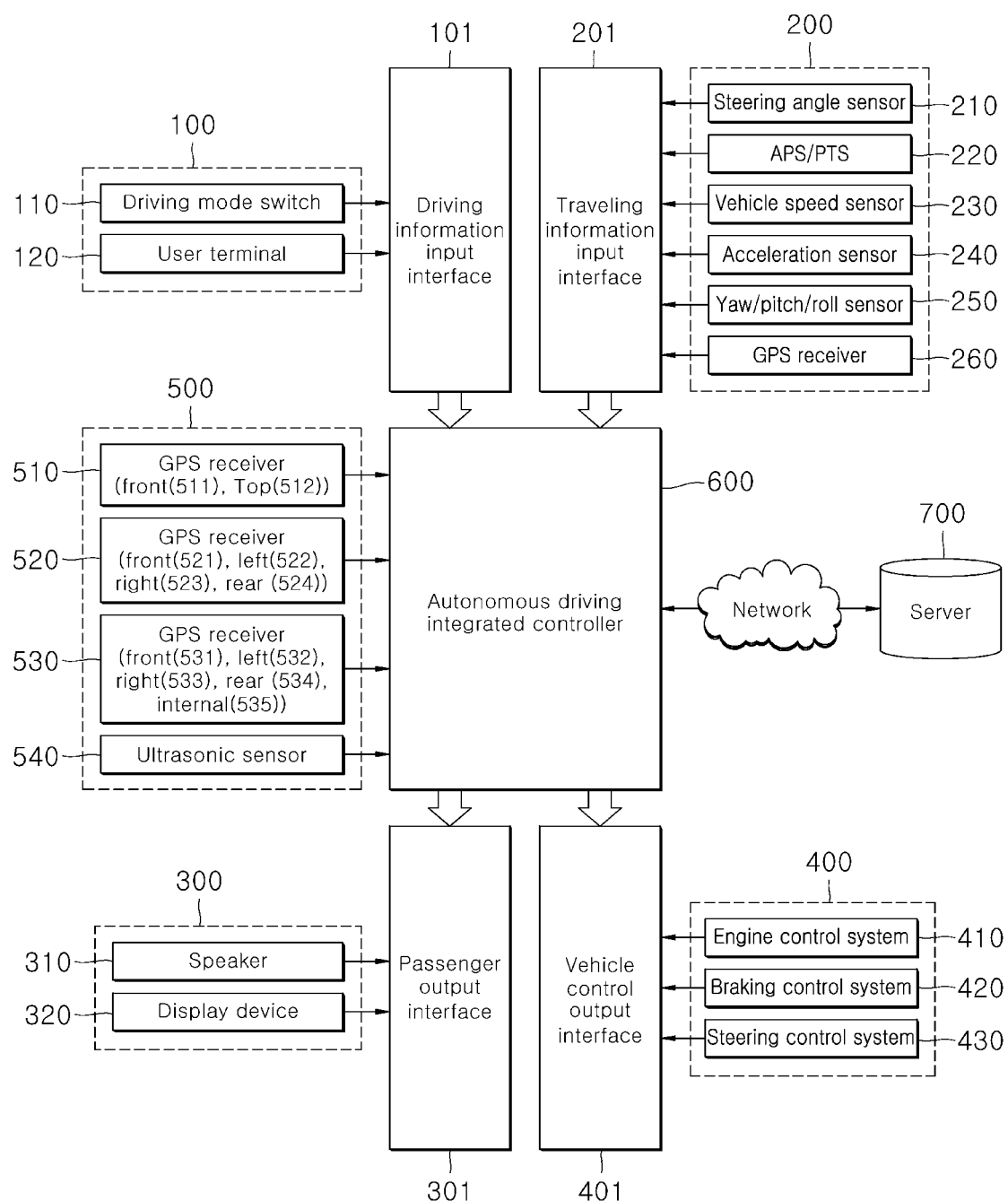
FIG. 1 is a general block diagram of an autonomous driving control system to which an autonomous driving apparatus according to an exemplary embodiment of the present invention may be applied.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, an autonomous driving apparatus and method will be described below with reference to the accompanying drawings through various exemplary embodiments. The thickness of lines or the size of elements shown in the drawings in this process may have been exaggerated for the clarity of a description and for convenience' sake. Terms to be described below have been defined by taking into consideration their functions in the disclosure, and may be changed depending on a user or operator's intention or practice. Accordingly, such terms should be interpreted based on the overall contents of this specification.

Figure 2:
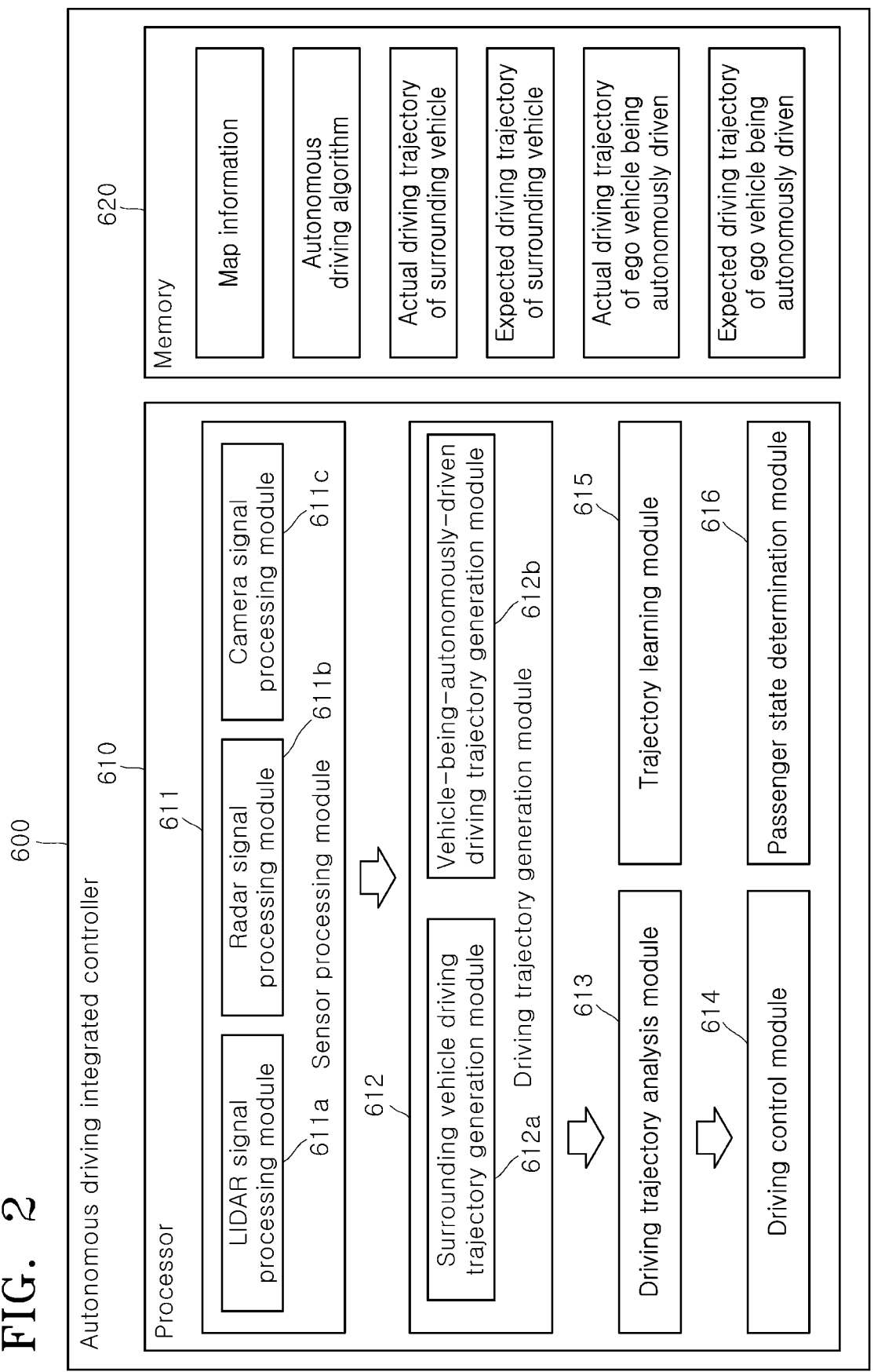
FIG. 2 is a block diagram illustrating a detailed configuration of an autonomous driving integrated controller in the autonomous driving apparatus according to an exemplary embodiment of the present invention.
Figure 3:
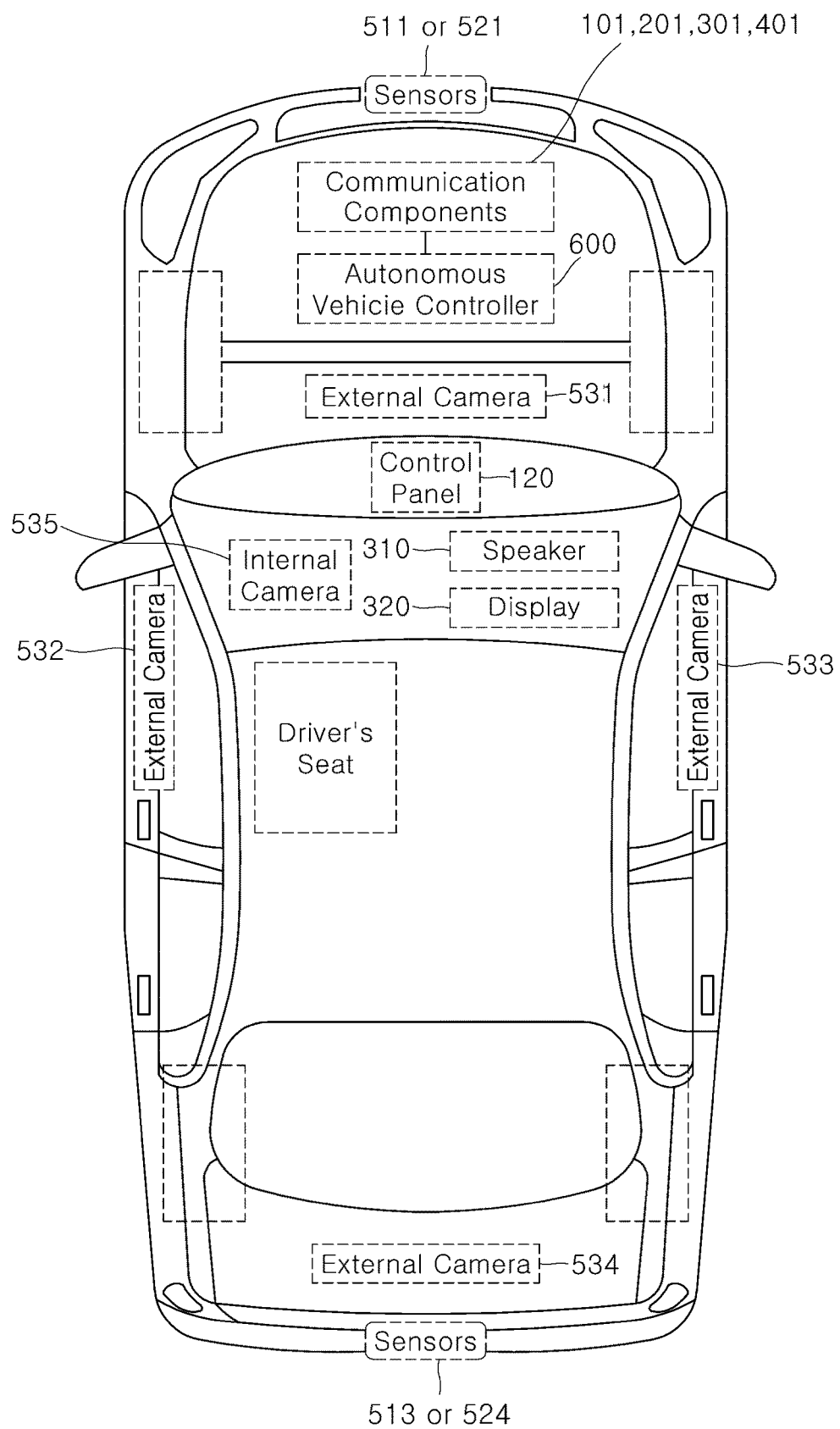
FIG. 3 is an exemplary diagram illustrating an example in which the autonomous driving apparatus according to an exemplary embodiment of the present invention is applied to a vehicle.
Figure 4:
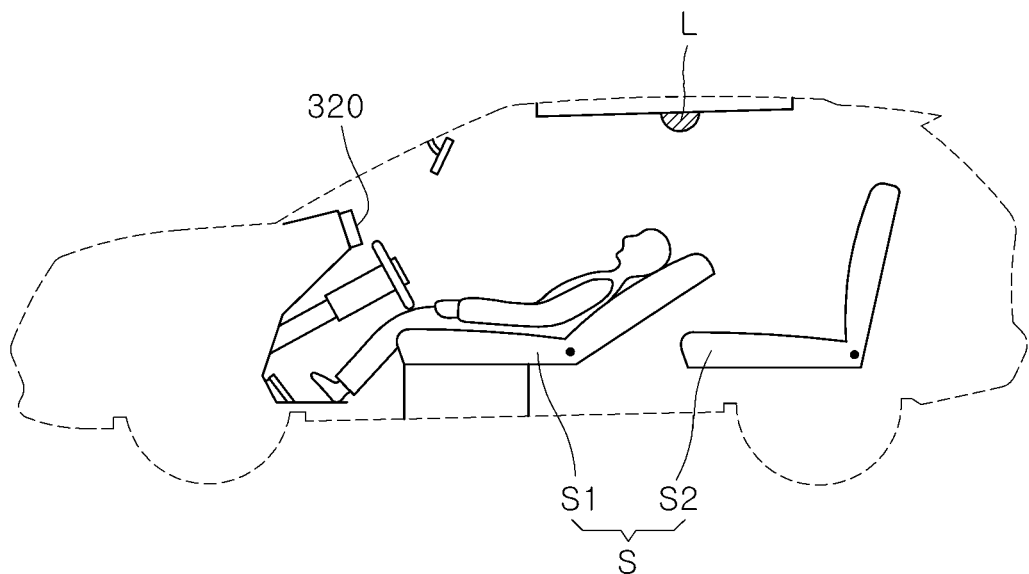
FIG. 4 is an exemplary diagram illustrating an example of an internal structure of a vehicle to which the autonomous driving apparatus according to an exemplary embodiment of the present invention is applied.
Figure 5:
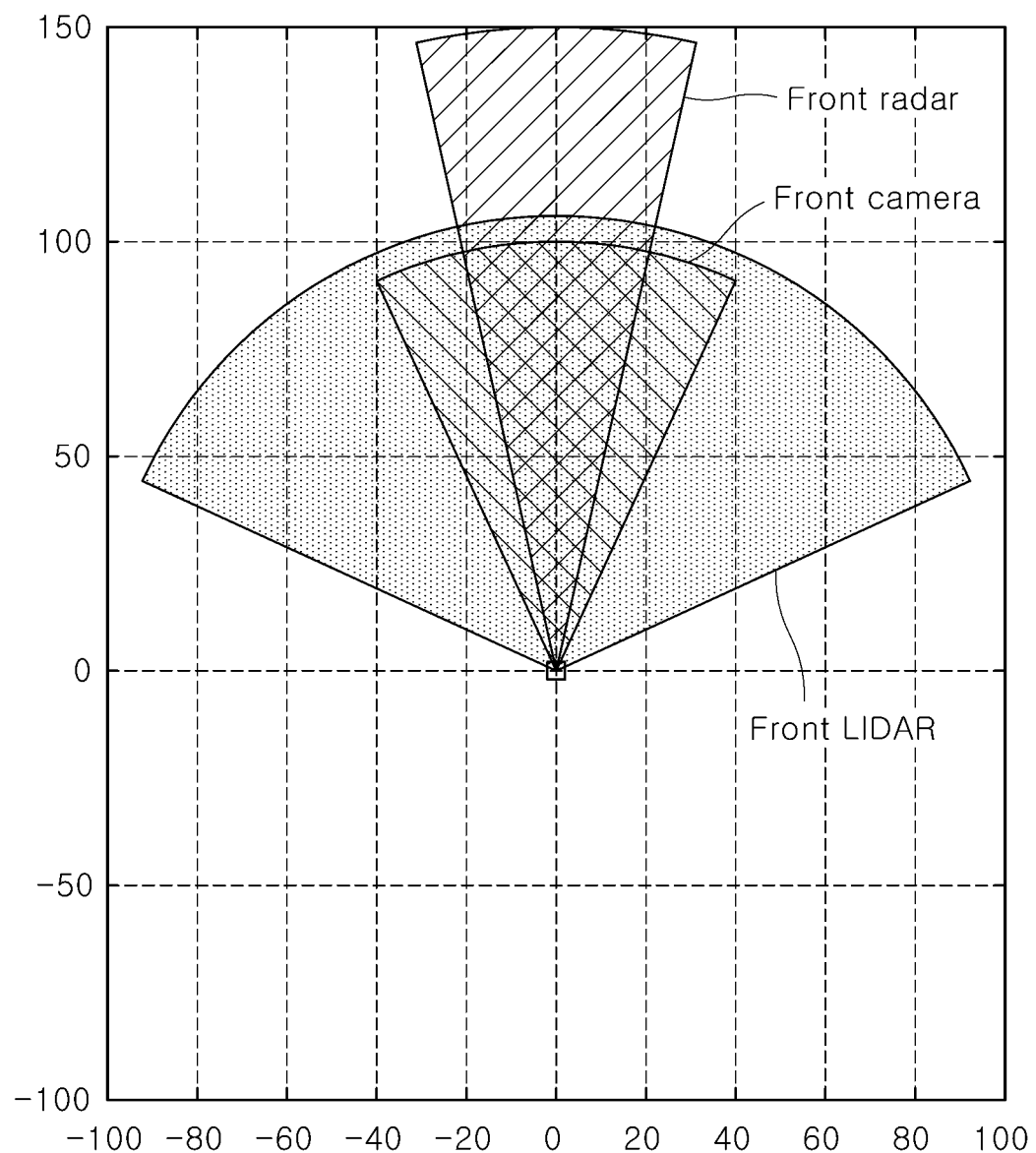
FIG. 5 is an exemplary diagram illustrating an example of a set distance and horizontal field of view within which a LIDAR sensor, a radar sensor and a camera sensor may detect a surrounding object in the autonomous driving apparatus according to an exemplary embodiment of the present invention.
Figure 6:
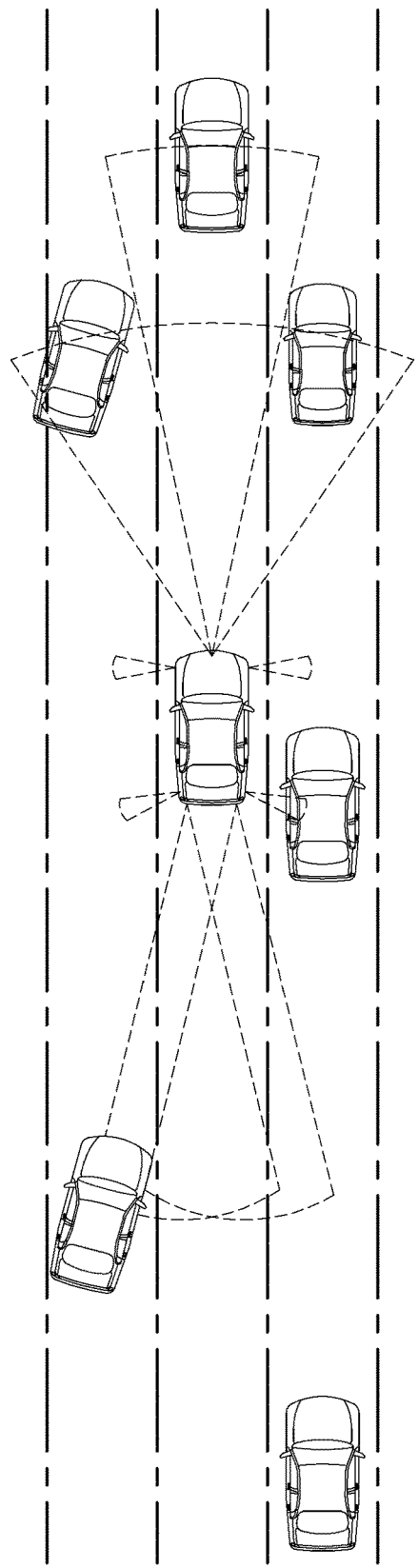
FIG. 6 is an exemplary diagram illustrating an example in which a sensor unit detects a surrounding vehicle in the autonomous driving apparatus according to an exemplary embodiment of the present invention.

FIG. 1 is a general block diagram of an autonomous driving control system to which an autonomous driving apparatus according to an exemplary embodiment of the present invention may be applied. FIG. 2 is a block diagram illustrating a detailed configuration of an autonomous driving integrated controller in the autonomous driving apparatus according to an exemplary embodiment of the present invention. FIG. 3 is an exemplary diagram illustrating an example in which the autonomous driving apparatus according to an exemplary embodiment of the present invention is applied to a vehicle. FIG. 4 is an exemplary diagram illustrating an example of an internal structure of a vehicle to which the autonomous driving apparatus according to an exemplary embodiment of the present invention is applied. FIG. 5 is an exemplary diagram illustrating an example of a set distance and horizontal field of view within which a LIDAR sensor, a radar sensor, and a camera sensor may detect a surrounding object in the autonomous driving apparatus according to an exemplary embodiment of the present invention. FIG. 6 is an exemplary diagram illustrating an example in which a sensor unit detects a surrounding vehicle in the autonomous driving apparatus according to an exemplary embodiment of the present invention.

First, the structure and functions of an autonomous driving control system to which an autonomous driving apparatus according to the present exemplary embodiment may be applied are described with reference to FIGS. 1 and 3. As illustrated in FIG. 1, the autonomous driving control system may be implemented based on an autonomous driving integrated controller 600 configured to transmit and receive data necessary for autonomous driving control of a vehicle through a driving information input interface 101, a traveling information input interface 201, a passenger output interface 301, and a vehicle control output interface 401.

The autonomous driving integrated controller 600 may obtain, through the driving information input interface 101, driving information based on a manipulation of a passenger for a user input unit 100 in an autonomous driving mode or manual driving mode of a vehicle. As illustrated in FIG. 1, the user input unit 100 may include a driving mode switch 110 and a user terminal 120 (e.g., a navigation terminal mounted on a vehicle or a smartphone or tablet PC owned by a passenger), for example. Accordingly, driving information may include driving mode information and navigation information of a vehicle. For example, a driving mode (i.e., an autonomous driving mode/manual driving mode or a sport mode/eco mode/safe mode/normal mode) of a vehicle determined by a manipulation of a passenger for the driving mode switch 110 may be transmitted to the autonomous driving integrated controller 600 through the driving information input interface 101 as the driving information. Furthermore, navigation information, such as the destination of a passenger and a path up to the destination (e.g., the shortest path or preference path, selected by the passenger, among candidate paths up to the destination) input by a passenger through the user terminal 120, may be transmitted to the autonomous driving integrated controller 600 through the driving information input interface 101 as the driving information. The user terminal 120 may be implemented as a control panel (e.g., touch screen panel) that provides a user interface (UI) through which a driver inputs or modifies information for autonomous driving control of a vehicle. In this case, the driving mode switch 110 may be implemented as a touch button on the user terminal 120.

Furthermore, the autonomous driving integrated controller 600 may obtain traveling information indicative of a driving state of a vehicle through the traveling information input interface 201. The traveling information may include a steering angle formed when a passenger manipulates a steering wheel, an acceleration pedal stroke or brake pedal stroke formed when an acceleration pedal or brake pedal is stepped on, and various types of information indicative of driving states and behaviors of a vehicle, such as a vehicle speed, acceleration, a yaw, a pitch and a roll, that is, behaviors formed in the vehicle. The pieces of traveling information may be detected by a traveling information detection unit 200, including a steering angle sensor 210, an accel position sensor (APS)/pedal travel sensor (PTS) 220, a vehicle speed sensor 230, an acceleration sensor 240, and a yaw/pitch/roll sensor 250, as illustrated in FIG. 1. Furthermore, the traveling information of a vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201, and may be used to control the driving of a vehicle in the autonomous driving mode or manual driving mode of the vehicle.

Furthermore, the autonomous driving integrated controller 600 may transmit, to an output unit 300, driving state information, provided to a passenger, through the passenger output interface 301 in the autonomous driving mode or manual driving mode of a vehicle. That is, the autonomous driving integrated controller 600 transmits driving state information of a vehicle to the output unit 300 so that a passenger can check the autonomous driving state or manual driving state of the vehicle based on the driving state information output through the output unit 300. The driving state information may include various types of information indicative of driving states of a vehicle, such as a current driving mode, transmission range and vehicle speed of the vehicle, for example. Furthermore, if it is determined that it is necessary to warn a driver in the autonomous driving mode or manual driving mode of a vehicle along with the driving state information, the autonomous driving integrated controller 600 transmits warning information to the output unit 300 through the passenger output interface 301 so that the output unit 300 can output a warning to the driver. In order to output such driving state information and warning information acoustically and visually, the output unit 300 may include a speaker 310 and a display 320 as illustrated in FIG. 1. In this case, the display 320 may be implemented as the same device as the user terminal 120 or may be implemented as an independent device separated from the user terminal 120.

Furthermore, the autonomous driving integrated controller 600 may transmit control information for driving control of a vehicle to a low-ranking control system 400, applied to a vehicle, through the vehicle control output interface 401 in the autonomous driving mode or manual driving mode of the vehicle. As illustrated in FIG. 1, the low-ranking control system 400 for driving control of a vehicle may include an engine control system 410, a braking control system 420 and a steering control system 430. The autonomous driving integrated controller 600 may transmit engine control information, braking control information and steering control information, as the control information, to the respective low-ranking control systems 410, 420 and 430 through the vehicle control output interface 401. Accordingly, the engine control system 410 may control the vehicle speed and acceleration of a vehicle by increasing or decreasing fuel supplied to an engine. The braking control system 420 may control the braking of the vehicle by controlling braking power of the vehicle. The steering control system 430 may control the steering of the vehicle through a steering apparatus (e.g., motor driven power steering (MDPS) system) applied to the vehicle.

As described above, the autonomous driving integrated controller 600 according to the present embodiment may obtain driving information based on a manipulation of a driver and traveling information indicative of a driving state of a vehicle through the driving information input interface 101 and the traveling information input interface 201, respectively, may transmit, to the output unit 300, driving state information and warning information, generated based on an autonomous driving algorithm processed by a processor 610 therein, through the passenger output interface 301, and may transmit, to the low-ranking control system 400, control information, generated based on the autonomous driving algorithm processed by the processor 610, through the vehicle control output interface 401 so that driving control of the vehicle is performed.

In order to guarantee stable autonomous driving of a vehicle, it is necessary to continuously monitor a driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a surrounding object of a vehicle, such as a surrounding vehicle, pedestrian, road or fixed facility (e.g., a signal light, a signpost, a traffic sign or a construction fence). The sensor unit 500 may include one or more of a LIDAR sensor 510, a radar sensor 520 and a camera sensor 530 in order to detect a surrounding object outside a vehicle, as illustrated in FIG. 1.

The LIDAR sensor 510 may transmit a laser signal to the periphery of a vehicle, and may detect a surrounding object outside the vehicle by receiving a signal reflected and returned from a corresponding object. The LIDAR sensor 510 may detect a surrounding object located within a set distance, set vertical field of view and set horizontal field of view, which are predefined depending on its specifications. The LIDAR sensor 510 may include a front LIDAR sensor 511, a top LIDAR sensor 512 and a rear LIDAR sensor 513 installed at the front, top and rear of a vehicle, respectively, but the installation location of each sensor and the number of sensors installed are not limited to a specific embodiment. A threshold for determining the validity of a laser signal reflected and returned from a corresponding object may be previously stored in a memory 620 of the autonomous driving integrated controller 600. The processor 610 of the autonomous driving integrated controller 600 may determine a location (including a distance to a corresponding object), speed and moving direction of the corresponding object using a method of measuring the time taken for a laser signal, transmitted through the LIDAR sensor 510, to be reflected and returned from the corresponding object.

The radar sensor 520 may radiate electromagnetic waves around a vehicle, and may detect a surrounding object outside the vehicle by receiving a signal reflected and returned from a corresponding object. The radar sensor 520 may detect a surrounding object within a set distance, set vertical field of view and set horizontal field of view, which are predefined depending on its specifications. The radar sensor 520 may include a front radar sensor 521, a left radar sensor 522, a right radar sensor 523 and a rear radar sensor 524 installed at the front, left, right and rear of a vehicle, respectively, but the installation location of each sensor and the number of sensors installed are not limited to a specific embodiment. The processor 610 of the autonomous driving integrated controller 600 may determine a location (including a distance to a corresponding object), speed and moving direction of the corresponding object using a method of analyzing power of electromagnetic waves transmitted and received through the radar sensor 520.

The camera sensor 530 may detect a surrounding object outside a vehicle by photographing the periphery of the vehicle, and may detect a surrounding object within a set distance, set vertical field of view and set horizontal field of view, which are predefined depending on its specifications. The camera sensor 530 may include a front camera sensor 531, a left camera sensor 532, a right camera sensor 533 and a rear camera sensor 534 installed at the front, left, right and rear of a vehicle, respectively, but the installation location of each sensor and the number of sensors installed are not limited to a specific embodiment. The processor 610 of the autonomous driving integrated controller 600 may determine a location (including a distance to a corresponding object), speed and moving direction of the corresponding object by applying predefined image processing to an image captured by the camera sensor 530. Furthermore, an internal camera sensor 535 for photographing the inside of a vehicle may be mounted at a given location (e.g., rear view mirror) within the vehicle. The processor 610 of the autonomous driving integrated controller 600 may monitor a behavior and state of a passenger based on an image captured by the internal camera sensor 535, and may output guidance or a warning to the passenger through the output unit 300.

As illustrated in FIG. 1, the sensor unit 500 may further include an ultrasonic sensor 540 in addition to the LIDAR sensor 510, the radar sensor 520 and the camera sensor 530, and may further adopt various types of sensors for detecting a surrounding object of a vehicle along with the sensors. FIG. 3 illustrates an example in which in order to help understanding of the present embodiment, the front LIDAR sensor 511 or the front radar sensor 521 has been installed at the front of a vehicle, the rear LIDAR sensor 513 or the rear radar sensor 524 has been installed at the rear of the vehicle, and the front camera sensor 531, the left camera sensor 532, the right camera sensor 533 and the rear camera sensor 534 have been installed at the front, left, right and rear of the vehicle, respectively. However, as described above, the installation location of each sensor and the number of sensors installed are not limited to a specific embodiment. FIG. 5 illustrates an example of a set distance and horizontal field of view within which the LIDAR sensor 510, the radar sensor 520 and the camera sensor 530 may detect a surrounding object ahead of the vehicle. FIG. 6 illustrates an example in which each sensor detects a surrounding object. FIG. 6 is merely an example of the detection of a surrounding object. A method of detecting a surrounding object is determined by the installation location of each sensor and the number of sensors installed. A surrounding vehicle and a surrounding object in the omni-directional area of an ego vehicle that autonomously travels may be detected depending on a configuration of the sensor unit 500.

Furthermore, in order to determine a state of a passenger within a vehicle, the sensor unit 500 may further include a microphone and bio sensor for detecting a voice and bio signal (e.g., heart rate, electrocardiogram, respiration, blood pressure, body temperature, electroencephalogram, hotoplethysmography (or pulse wave) and blood sugar) of the passenger. The bio sensor may include a heart rate sensor, an electrocardiogram sensor, a respiration sensor, a blood pressure sensor, a body temperature sensor, an electroencephalogram sensor, a photoplethysmography sensor and a blood sugar sensor.

FIG. 4 illustrates an example of an internal structure of a vehicle. An internal device whose state is controlled by a manipulation of a passenger, such as a driver or fellow passenger of a vehicle, and which supports driving or convenience (e.g., rest or entertainment activities) of the passenger may be installed within the vehicle. Such an internal device may include a vehicle seat S in which a passenger is seated, a lighting device L such as an internal light and a mood lamp, the user terminal 120, the display 320, and an internal table. The state of the internal device may be controlled by the processor 610.

The angle of the vehicle seat S may be adjusted by the processor 610 (or by a manual manipulation of a passenger). If the vehicle seat S is configured with a front row seat 51 and a back row seat S2, only the angle of the front row seat 51 may be adjusted. If the back row seat S2 is not provided and the front row seat 51 is divided into a seat structure and a footstool structure, the front row seat 51 may be implemented so that the seat structure of the front row seat 51 is physically separated from the footstool structure and the angle of the front row seat 51 is adjusted. Furthermore, an actuator (e.g., motor) for adjusting the angle of the vehicle seat S may be provided. The on and off of the lighting device L may be controlled by the processor 610 (or by a manual manipulation of a passenger). If the lighting device L includes a plurality of lighting units such as an internal light and a mood lamp, the on and off of each of the lighting units may be independently controlled. The angle of the user terminal 120 or the display 320 may be adjusted by the processor 610 (or by a manual manipulation of a passenger) based on an angle of field of a passenger. For example, the angle of the user terminal 120 or the display 320 may be adjusted so that a screen thereof is placed in a passenger's gaze direction. In this case, an actuator (e.g., motor) for adjusting the angle of the user terminal 120 and the display 320 may be provided.

As illustrated in FIG. 1, the autonomous driving integrated controller 600 may communicate with a server 700 over a network. Various communication methods, such as a wide area network (WAN), a local area network (LAN) or a personal area network (PAN), may be adopted as a network method between the autonomous driving integrated controller 600 and the server 700. Furthermore, in order to secure wide network coverage, a low power wide area network (LPWAN, including commercialized technologies such as LoRa, Sigfox, Ingenu, LTE-M and NB-IOT, that is, networks having very wide coverage, among the IoT) communication method may be adopted. For example, a LoRa (capable of low power communication and also having wide coverage of a maximum of about 20 Km) or Sigfox (having coverage of 10 Km (downtown) to 30 Km (in the outskirt area outside the downtown area) according to environments) communication method may be adopted. Furthermore, LTE network technologies based on $3^{rd}$ generation partnership project (3GPP) Release 12, 13, such as machine-type communications (LTE-MTC) (or LTE-M), narrowband (NB) LTE-M, and NB IoT having a power saving mode (PSM), may be adopted. The server 700 may provide the latest map information (may correspond to various types of map information, such as two-dimensional (2-D) navigation map data, three-dimensional (3-D) manifold map data or 3-D high-precision electronic map data). Furthermore, the server 700 may provide various types of information, such as accident information, road control information, traffic volume information and weather information in a road. The autonomous driving integrated controller 600 may update map information, stored in the memory 620, by receiving the latest map information from the server 700, may receive accident information, road control information, traffic volume information and weather information, and may use the information for autonomous driving control of a vehicle.

The structure and functions of the autonomous driving integrated controller 600 according to the present embodiment are described with reference to FIG. 2. As illustrated in FIG. 2, the autonomous driving integrated controller 600 may include the processor 610 and the memory 620.

The memory 620 may store basic information necessary for autonomous driving control of a vehicle or may store information generated in an autonomous driving process of a vehicle controlled by the processor 610. The processor 610 may access (or read) information stored in the memory 620, and may control autonomous driving of a vehicle. The memory 620 may be implemented as a computer-readable recording medium, and may operate in such a way to be accessed by the processor 610. Specifically, the memory 620 may be implemented as a hard drive, a magnetic tape, a memory card, a read-only memory (ROM), a random access memory (RAM), a digital video disc (DVD) or an optical data storage, such as an optical disk.

The memory 620 may store map information that is required for autonomous driving control by the processor 610. The map information stored in the memory 620 may be a navigation map (or a digital map) that provides information of a road unit, but may be implemented as a precise road map that provides road information of a lane unit, that is, 3-D high-precision electronic map data, in order to improve the precision of autonomous driving control. Accordingly, the map information stored in the memory 620 may provide dynamic and static information necessary for autonomous driving control of a vehicle, such as a lane, the center line of a lane, an enforcement lane, a road boundary, the center line of a road, a traffic sign, a road mark, the shape and height of a road, and a lane width.

Furthermore, the memory 620 may store the autonomous driving algorithm for autonomous driving control of a vehicle. The autonomous driving algorithm is an algorithm (recognition, determination and control algorithm) for recognizing the periphery of an autonomous vehicle, determining the state of the periphery thereof, and controlling the driving of the vehicle based on a result of the determination. The processor 610 may perform active autonomous driving control for a surrounding environment of a vehicle by executing the autonomous driving algorithm stored in the memory 620.

The processor 610 may control autonomous driving of a vehicle based on the driving information and the traveling information received from the driving information input interface 101 and the traveling information input interface 201, respectively, the information on a surrounding object detected by the sensor unit 500, and the map information and the autonomous driving algorithm stored in the memory 620. The processor 610 may be implemented as an embedded processor, such as a complex instruction set computer (CICS) or a reduced instruction set computer (RISC), or a dedicated semiconductor circuit, such as an application-specific integrated circuit (ASIC).

In the present embodiment, the processor 610 may control autonomous driving of an ego vehicle that autonomously travels by analyzing the driving trajectory of each of the ego vehicle that autonomously travels and a surrounding vehicle. To this end, the processor 610 may include a sensor processing module 611, a driving trajectory generation module 612, a driving trajectory analysis module 613, a driving control module 614, a passenger state determination module 616 and a trajectory learning module 615, as illustrated in FIG. 2. FIG. 2 illustrates each of the modules as an independent block based on its function, but the modules may be integrated into a single module and implemented as an element for integrating and performing the functions of the modules.

The sensor processing module 611 may determine traveling information of a surrounding vehicle (i.e., includes the location of the surrounding vehicle, and may further include the speed and moving direction of the surrounding vehicle along the location) based on a result of detecting, by the sensor unit 500, the surrounding vehicle around an ego vehicle that autonomously travels. That is, the sensor processing module 611 may determine the location of a surrounding vehicle based on a signal received through the LIDAR sensor 510, may determine the location of a surrounding vehicle based on a signal received through the radar sensor 520, may determine the location of a surrounding vehicle based on an image captured by the camera sensor 530, and may determine the location of a surrounding vehicle based on a signal received through the ultrasonic sensor 540. To this end, as illustrated in FIG. 1, the sensor processing module 611 may include a LIDAR signal processing module 611a, a radar signal processing module 611b and a camera signal processing module 611c. In some embodiments, an ultrasonic signal processing module (not illustrated) may be further added to the sensor processing module 611. An implementation method of the method of determining the location of a surrounding vehicle using the LIDAR sensor 510, the radar sensor 520 and the camera sensor 530 is not limited to a specific embodiment. Furthermore, the sensor processing module 611 may determine attribute information, such as the size and type of a surrounding vehicle, in addition to the location, speed and moving direction of the surrounding vehicle. An algorithm for determining information, such as the location, speed, moving direction, size and type of a surrounding vehicle, may be predefined.

The driving trajectory generation module 612 may generate an actual driving trajectory and expected driving trajectory of a surrounding vehicle and an actual driving trajectory of an ego vehicle that autonomously travels. To this end, as illustrated in FIG. 2, the driving trajectory generation module 612 may include a surrounding vehicle driving trajectory generation module 612a and a vehicle-being-autonomously-driven driving trajectory generation module 612b.

First, the surrounding vehicle driving trajectory generation module 612a may generate an actual driving trajectory of a surrounding vehicle.

Specifically, the surrounding vehicle driving trajectory generation module 612a may generate an actual driving trajectory of a surrounding vehicle based on traveling information of the surrounding vehicle detected by the sensor unit 500 (i.e., the location of the surrounding vehicle determined by the sensor processing module 611). In this case, in order to generate the actual driving trajectory of the surrounding vehicle, the surrounding vehicle driving trajectory generation module 612a may refer to map information stored in the memory 620, and may generate the actual driving trajectory of the surrounding vehicle by making cross reference to the location of the surrounding vehicle detected by the sensor unit 500 and a given location in the map information stored in the memory 620. For example, when a surrounding vehicle is detected at a specific point by the sensor unit 500, the surrounding vehicle driving trajectory generation module 612a may specify a currently detected location of the surrounding vehicle in map information stored in the memory 620 by making cross reference to the detected location of the surrounding vehicle and a given location in the map information. The surrounding vehicle driving trajectory generation module 612a may generate an actual driving trajectory of a surrounding vehicle by continuously monitoring the location of the surrounding vehicle as described above. That is, the surrounding vehicle driving trajectory generation module 612a may generate an actual driving trajectory of a surrounding vehicle by mapping the location of the surrounding vehicle, detected by the sensor unit 500, to a location in map information, stored in the memory 620, based on the cross reference and accumulating the location.

An actual driving trajectory of a surrounding vehicle may be compared with an expected driving trajectory of the surrounding vehicle to be described later to be used to determine whether map information stored in the memory 620 is accurate. In this case, if an actual driving trajectory of a specific surrounding vehicle is compared with an expected driving trajectory, there may be a problem in that it is erroneously determined that map information stored in the memory 620 is inaccurate although the map information is accurate. For example, if actual driving trajectories and expected driving trajectories of multiple surrounding vehicles are the same and an actual driving trajectory and expected driving trajectory of a specific surrounding vehicle are different, when only the actual driving trajectory of the specific surrounding vehicle is compared with the expected driving trajectory, it may be erroneously determined that map information stored in the memory 620 is inaccurate although the map information is accurate. In order to prevent this problem, it is necessary to determine whether the tendency of actual driving trajectories of a plurality of surrounding vehicles gets out of an expected driving trajectory. To this end, the surrounding vehicle driving trajectory generation module 612a may generate the actual driving trajectory of each of the plurality of surrounding vehicles. Furthermore, if it is considered that a driver of a surrounding vehicle tends to slightly move a steering wheel left and right during his or her driving process for the purpose of straight-line path driving, an actual driving trajectory of the surrounding vehicle may be generated in a curved form, not a straight-line form. In order to compute an error between expected driving trajectories to be described later, the surrounding vehicle driving trajectory generation module 612a may generate an actual driving trajectory of a straight-line form by applying a given smoothing scheme to the original actual driving trajectory generated in a curved form. Various schemes, such as interpolation for each location of a surrounding vehicle, may be adopted as the smoothing scheme.

Furthermore, the surrounding vehicle driving trajectory generation module 612a may generate an expected driving trajectory of a surrounding vehicle based on map information stored in the memory 620.

As described above, the map information stored in the memory 620 may be 3-D high-precision electronic map data. Accordingly, the map information may provide dynamic and static information necessary for autonomous driving control of a vehicle, such as a lane, the center line of a lane, an enforcement lane, a road boundary, the center line of a road, a traffic sign, a road mark, a shape and height of a road, and a lane width. If it is considered that a vehicle commonly travels in the middle of a lane, it may be expected that a surrounding vehicle that travels around an ego vehicle that autonomously travels will also travel in the middle of a lane. Accordingly, the surrounding vehicle driving trajectory generation module 612a may generate an expected driving trajectory of the surrounding vehicle as the center line of a road incorporated into map information.

The vehicle-being-autonomously-driven driving trajectory generation module 612b may generate an actual driving trajectory of an ego vehicle that autonomously travels that has been driven so far based on the traveling information of the ego vehicle that autonomously travels obtained through the traveling information input interface 201.

Specifically, the vehicle-being-autonomously-driven driving trajectory generation module 612b may generate an actual driving trajectory of an ego vehicle that autonomously travels by making cross reference to a location of the ego vehicle that autonomously travels obtained through the traveling information input interface 201 (i.e., information on the location of the ego vehicle that autonomously travels obtained by the GPS receiver 260) and a given location in map information stored in the memory 620. For example, the vehicle-being-autonomously-driven driving trajectory generation module 612b may specify a current location of an ego vehicle that autonomously travels, in map information, stored in the memory 620, by making cross reference to a location of the ego vehicle that autonomously travels obtained through the traveling information input interface 201 and a given location in the map information. As described above, the vehicle-being-autonomously-driven driving trajectory generation module 612b may generate an actual driving trajectory of the ego vehicle that autonomously travels by continuously monitoring the location of the ego vehicle that autonomously travels. That is, the vehicle-being-autonomously-driven driving trajectory generation module 612b may generate the actual driving trajectory of the ego vehicle that autonomously travels by mapping the location of the ego vehicle that autonomously travels, obtained through the traveling information input interface 201, to a location in the map information stored in the memory 620, based on the cross reference and accumulating the location.

Furthermore, the vehicle-being-autonomously-driven driving trajectory generation module 612b may generate an expected driving trajectory up to the destination of an ego vehicle that autonomously travels based on map information stored in the memory 620.

That is, the vehicle-being-autonomously-driven driving trajectory generation module 612b may generate the expected driving trajectory up to the destination using a current location of the ego vehicle that autonomously travels obtained through the traveling information input interface 201 (i.e., information on the current location of the ego vehicle that autonomously travels obtained through the GPS receiver 260) and the map information stored in the memory 620. Like the expected driving trajectory of the surrounding vehicle, the expected driving trajectory of the ego vehicle that autonomously travels may be generated as the center line of a road incorporated into the map information stored in the memory 620.

The driving trajectories generated by the surrounding vehicle driving trajectory generation module 612a and the vehicle-being-autonomously-driven driving trajectory generation module 612b may be stored in the memory 620, and may be used for various purposes in a process of controlling, by the processor 610, autonomous driving of an ego vehicle that autonomously travels.

The driving trajectory analysis module 613 may diagnose current reliability of autonomous driving control for an ego vehicle that autonomously travels by analyzing driving trajectories (i.e., an actual driving trajectory and expected driving trajectory of a surrounding vehicle and an actual driving trajectory of the ego vehicle that autonomously travels) that are generated by the driving trajectory generation module 612 and stored in the memory 620. The diagnosis of the reliability of autonomous driving control may be performed in a process of analyzing a trajectory error between the actual driving trajectory and expected driving trajectory of the surrounding vehicle.

The driving control module 614 may perform a function for controlling autonomous driving of an ego vehicle that autonomously travels. Specifically, the driving control module 614 may process the autonomous driving algorithm synthetically using the driving information and the traveling information received through the driving information input interface 101 and the traveling information input interface 201, respectively, the information on a surrounding object detected by the sensor unit 500, and the map information stored in the memory 620, may transmit the control information to the low-ranking control system 400 through the vehicle control output interface 401 so that the low-ranking control system 400 controls autonomous driving of an ego vehicle that autonomously travels, and may transmit the driving state information and warning information of the ego vehicle that autonomously travels to the output unit 300 through the passenger output interface 301 so that a driver can recognize the driving state information and warning information. Furthermore, when integrating and controlling such autonomous driving, the driving control module 614 controls the autonomous driving by taking into consideration the driving trajectories of an ego vehicle that autonomously travels and a surrounding vehicle, which have been analyzed by the sensor processing module 611, the driving trajectory generation module 612 and the driving trajectory analysis module 613, thereby improving the precision of autonomous driving control and enhancing the safety of autonomous driving control.

The trajectory learning module 615 may perform learning or corrections on an actual driving trajectory of an ego vehicle that autonomously travels generated by the vehicle-being-autonomously-driven driving trajectory generation module 612b. For example, when a trajectory error between an actual driving trajectory and expected driving trajectory of a surrounding vehicle is a preset threshold or more, the trajectory learning module 615 may determine that an actual driving trajectory of an ego vehicle that autonomously travels needs to be corrected by determining that map information stored in the memory 620 is inaccurate. Accordingly, the trajectory learning module 615 may determine a lateral shift value for correcting the actual driving trajectory of the ego vehicle that autonomously travels, and may correct the driving trajectory of the ego vehicle that autonomously travels.

The passenger state determination module 616 may determine a state and behavior of a passenger based on a state and bio signal of the passenger detected by the internal camera sensor 535 and the bio sensor. The state of the passenger determined by the passenger state determination module 616 may be used for autonomous driving control over an ego vehicle that autonomously travels or in a process of outputting a warning to the passenger.

Hereinafter, a first exemplary embodiment in which a warning corresponding to an autonomous driving risk of an ego vehicle is output to a passenger is described based on the aforementioned contents.

As described above, (the driving trajectory generation module 612 of) the processor 610 according to the present embodiment may generate an actual driving trajectory of a surrounding vehicle based on driving information of the surrounding vehicle detected by the sensor unit 500. That is, when the surrounding vehicle is detected at a specific point by the sensor unit 500, the processor 610 may specify the location of the currently detected surrounding vehicle in map information by making cross reference to the location of the detected surrounding vehicle and a location in the map information stored in the memory 620. The processor 610 may generate the actual driving trajectory of the surrounding vehicle by continuously monitoring the location of the surrounding vehicle as described above.

Furthermore, (the driving trajectory generation module 612 of) the processor 610 may generate an expected driving trajectory of the surrounding vehicle based on the map information stored in the memory 620. In this case, the processor 610 may generate the expected driving trajectory of the surrounding vehicle as the middle line of a lane incorporated into the map information.

Thereafter, the processor 610 may determine an autonomous driving risk of the ego vehicle based on whether a driving mode of the surrounding vehicle is an autonomous driving mode and a trajectory error between the actual driving trajectory and expected driving trajectory of the surrounding vehicle, and may output a warning to a passenger through the output unit 300 at a level corresponding to the determined autonomous driving risk. The autonomous driving risk of the ego vehicle may be defined to mean the possibility that a collision against an external object may occur in the autonomous driving process of the ego vehicle. In this case, the processor 610 may output warnings to the passenger through the output unit 300 as first to third levels based on ascending order of autonomous driving risk of the ego vehicle.

The warning corresponding to the first level may mean a warning output to the u) passenger when the autonomous driving risk of the ego vehicle is at the lowest level. For example, the warning may be implemented as an embodiment in which a visual display with a first color (e.g., blue) is output through the output unit 300. The warning corresponding to the second level may mean a warning output to the passenger when the autonomous driving risk of the ego vehicle is at a middle level. For example, the warning corresponding to the second level may be implemented as an embodiment in which a visual display with a second color (e.g., yellow) is output through the output unit 300. The warning corresponding to the third level may mean a warning output to the passenger when the autonomous driving risk of the ego vehicle is at the highest level. For example, the warning corresponding to the third level may be implemented as an embodiment in which a visual display with a third color (e.g., red) is output and a given voice warning is output along with the visual display through the output unit 300. The visual warning and the auditory warning may be output through the display device 320 and speaker 310 of the output unit 300. Furthermore, the visual warning and the auditory warning are merely examples for helping understanding of the present embodiment, and may be implemented as various embodiments within the range in which a passenger may recognize a current level of the autonomous driving risk of an ego vehicle. A detailed implementation method of the embodiment is not limited to a specific embodiment. For example, the detailed implementation method may include an additional implementation example, such as a warning using the vibration of a seat depending on the specifications of a vehicle. A method of outputting the warnings corresponding to the first to third levels may be set or modified by a passenger based on a UI provided by the user terminal 120 or a UI provided by the display device 320 itself.

A construction in which the processor 610 outputs a warning to the passenger through the output unit 300 at a level corresponding to an autonomous driving risk is described in detail. The processor 610 may determine whether a driving mode of a surrounding vehicle is the autonomous driving mode or the manual driving mode based on V2X communication.

When the driving mode of the surrounding vehicle is the autonomous driving mode, the processor 610 may output, to a passenger, the warning corresponding to the first level through the output unit 300. That is, when the driving mode of the surrounding vehicle is the autonomous driving mode, the possibility that an unexpected situation may occur due to the manual driving of the driver of the surrounding vehicle or the possibility that a collision against an ego vehicle may occur due to poor driving of the driver of the surrounding vehicle may be considered as being relatively low. In this case, the processor 610 may determine that the autonomous driving risk of the ego vehicle corresponds to the lowest level, and may output, to the passenger, the warning corresponding to the first level through the output unit 300.

When the driving mode of the surrounding vehicle is the manual driving mode, the processor 610 may output, to the passenger, the warning corresponding to the second level through the output unit 300. That is, when the driving mode of the surrounding vehicle is the manual driving mode, the possibility that an unexpected situation may occur due to the manual driving of the driver of the surrounding vehicle or the possibility that a collision against an ego vehicle may occur due to poor driving of the driver of the surrounding vehicle may be considered as being relatively high compared to a case where the surrounding vehicle travels in the autonomous driving mode. In this case, the processor 610 may determine that the autonomous driving risk of the ego vehicle corresponds to a middle level, and may output, to the passenger, the warning corresponding to the second level through the output unit 300.

As described above, the warning corresponding to the first or second level is output to a passenger through the process of determining whether a driving mode of a surrounding vehicle is the autonomous driving mode. Accordingly, the passenger can effectively recognize an autonomous driving risk attributable to an external factor, that is, an autonomous driving risk based on a collision between an ego vehicle and the surrounding vehicle, which is caused by the driving of the surrounding vehicle.

The processor 610 may perform the diagnosis of the reliability of autonomous driving control over an ego vehicle based on a trajectory error between an actual driving trajectory and expected driving trajectory of a surrounding vehicle. If, as a result of the execution, it is determined that the autonomous driving control over the ego vehicle is unreliable, the processor 610 may output, to a passenger, the warning corresponding to the third level through the output unit 300. When performing the diagnosis of reliability of the autonomous driving control over the ego vehicle, the processor 610 may perform the diagnosis of reliability of the autonomous driving control over the ego vehicle based on the size of a trajectory error between the actual driving trajectory and expected driving trajectory of the surrounding vehicle or the cumulative addition of the trajectory errors.

Specifically, the state in which a trajectory error between the actual driving trajectory and expected driving trajectory of the surrounding vehicle is present may correspond to the state in which the autonomous driving control performed on the ego vehicle is unreliable. That is, if an error is present between the actual driving trajectory generated based on driving information of the surrounding vehicle detected by the sensor unit 500 and the expected driving trajectory generated based on map information stored in the memory 620, this means the state in which the surrounding vehicle does not travel along the middle line of a lane in the map information that the surrounding vehicle is expected to travel. This means that there is the possibility that the surrounding vehicle might be erroneously detected by the sensor unit 500 or the possibility that the map information stored in the memory 620 may be inaccurate. That is, two possibilities may be present. First, although a surrounding vehicle actually travels based on an expected driving trajectory, an error may occur in an actual driving trajectory of the surrounding vehicle due to the abnormality of the sensor unit 500. Second, the map information stored in the memory 620 and the state of a road on which the surrounding vehicle now travels may not be matched (e.g., the surrounding vehicles travel in a shifted lane because the lane has shifted to the left or right compared to the map information, stored in the memory 620, due to a construction or re-maintenance on a road on which the surrounding vehicle now travels). Accordingly, the processor 610 may perform the diagnosis of reliability of autonomous driving control over the ego vehicle based on the size of a trajectory error between the actual driving trajectory and expected driving trajectory of the surrounding vehicle or a cumulative addition of the trajectory errors. Furthermore, as described above, in order to take into consideration an overall driving tendency of the surrounding vehicle, trajectory errors between actual driving trajectories and expected driving trajectories of a plurality of surrounding vehicles, not an actual driving trajectory of any specific surrounding vehicle, may be taken into consideration.

A process of performing, by the processor 610, the diagnosis of reliability based on a trajectory error between an actual driving trajectory and expected driving trajectory of a surrounding vehicle is described in detail. First, when the state in which the size of a trajectory error is a preset first threshold value or more occurs within a preset first critical time, the processor 610 may determine that autonomous driving control over an ego vehicle is unreliable.

In this case, the first critical time means a time preset to diagnose the reliability of the autonomous driving control. Timing, that is, a criterion for the time, may be timing at which a comparison between an actual driving trajectory and expected driving trajectory of a surrounding vehicle is initiated by the processor 610. Specifically, a process of generating, by the processor 610, an actual driving trajectory and expected driving trajectory of a surrounding vehicle, calculating a trajectory error between the actual driving trajectory and the expected driving trajectory, and diagnosing the reliability of autonomous driving control may be periodically executed in a preset determination cycle in order to reduce the resource of the memory 620 and a computational load of the processor 610 (accordingly, an actual driving trajectory and expected driving trajectory of a surrounding vehicle stored in the memory 620 may be periodically deleted in the determination cycle). In this case, when the state in which the size of the trajectory error is the first threshold value or more occurs before the first critical time elapses from timing at which any one cycle was initiated, the processor 610 may determine that the autonomous driving control is unreliable. The size of the first critical time, which is a value smaller than the size of the temporal section of the determination cycle, may be designed in various ways depending on a designer's intention and stored in the memory 620. Furthermore, the first threshold value may be designed in various ways depending on a designer's intention and stored in the memory 620.

Furthermore, the processor 610 may additionally perform the diagnosis of reliability using the cumulative addition of the trajectory errors while the size of the trajectory error is less than the first threshold value for the first critical time. That is, although the size of the trajectory error is less than the first threshold value for the first critical time, when an accumulated and added value of the trajectory errors less than the first threshold value is a given value or more, the state of the surrounding vehicle corresponds to the state in which in spite of the small degree of error, the surrounding vehicle has traveled for a given time with deviating from the expected driving trajectory. Accordingly, the processor 610 can more precisely determine whether the autonomous driving control over the ego vehicle is reliable, by additionally performing the diagnosis of reliability using the cumulative addition of the trajectory errors.

In this case, in the state in which the size of the trajectory error is less than the first threshold value for the first critical time, when the state in which a cumulative addition of the trajectory errors (i.e., an accumulated and added value of the trajectory errors within one cycle) is the preset second threshold value or more occurs within a second critical time preset as a value greater than the first critical time, the processor 610 may determine that the autonomous driving control over the ego vehicle is unreliable. In this case, the second critical time, which is a value greater than the first critical time and smaller than the size of a temporal section of the determination cycle, may be previously stored in the memory 620. Furthermore, the second threshold value may be designed in various ways depending on a designer's intention and stored in the memory 620.

If it is determined through the aforementioned process that the autonomous driving control over the ego vehicle is unreliable, the processor 610 may output, to the passenger, the warning corresponding to the third level through the output unit 300. That is, an autonomous driving risk when it is determined through the aforementioned process that the autonomous driving control over the ego vehicle is unreliable may be considered as being higher than an autonomous driving risk caused in the autonomous driving mode or manual driving mode of the surrounding vehicle. Accordingly, the processor 610 may determine that the autonomous driving risk corresponds to the highest level, and may output, to the passenger, the warning corresponding to the third level through the output unit 300. In this case, the processor 610 may output the warning to the passenger through the output unit 300 by taking into consideration a state of the passenger (i.e., the state of the passenger determined by the passenger state determination module 616) detected by (the internal camera sensor 535 of) the sensor unit 500. In this case, if it is determined that the passenger does not keep eyes forward, the processor 610 may output the warning to the passenger through the output unit 300. Accordingly, the passenger can recognize the warning corresponding to the third level output through the output unit 300, and can take suitable follow-up measures by perceiving the possibility that an operation of the sensor unit 500 may be abnormal or the possibility that the map information stored in the memory 620 may be inaccurate.

As described above, the reliability of the autonomous driving control over the ego vehicle is diagnosed, and the warning corresponding to the third level is output to the passenger. Accordingly, the passenger can effectively recognize the autonomous driving risk attributable to an internal factor, that is, the autonomous driving risk attributable to a collision between the ego vehicle and the surrounding vehicle which is caused by erroneous autonomous driving control over the ego vehicle itself.

After outputting the warning to the passenger through the output unit 300, when the size of the trajectory error between the actual driving trajectory and expected driving trajectory of the surrounding vehicle becomes less than the first threshold value or the cumulative addition of the trajectory errors becomes less than the second threshold value, the processor 610 may release the warning output through the output unit 300. That is, after the warning is output, when the size of the trajectory error becomes less than the first threshold value or the cumulative addition of the trajectory errors becomes less than the second threshold value within any one cycle, this means that the reliability of the autonomous driving control over the ego vehicle has restored. Accordingly, the processor 610 can prevent an unnecessary warning from being output to a driver by releasing the warning output through the output unit 300. In this case, if the warning has been output at specific timing although the warning output through the output unit 300 has been released, this means that there is a possibility that the map information stored in the memory 620 may be inaccurate with respect to a specific point or section in a road. Accordingly, the processor 610 may update map information, stored in the memory 620, with new map information subsequently received from the server 700 at timing at which current autonomous driving control over an ego vehicle is not affected.

Furthermore, after outputting the warning to the passenger through the output unit 300, if it is determined that a state of the passenger detected by the sensor unit 500 is a forward looking state, the processor 610 may release the warning output through the output unit 300. That is, if the passenger keeps eyes forward after the warning is output, it may be determined that the ego vehicle currently safely travels. Accordingly, the processor 610 can prevent an unnecessary warning from being output to a driver by releasing the warning output through the output unit 300. In this case, the processor 610 may update map information, stored in the memory 620, with new map information subsequently received from the server 700 at timing at which current autonomous driving control over an ego vehicle is not affected.

When the autonomous driving mode of the ego vehicle is turned off based on an autonomous driving risk of the ego vehicle determined based on the trajectory error between the actual driving trajectory and expected driving trajectory of the surrounding vehicle, the processor 610 may control one or more of the driving of the ego vehicle and communication with an external organization based on a state of the passenger detected by the sensor unit 500. That is, even after the warning is output to the passenger through the output unit 300, if it is determined that the size of a trajectory error between the actual driving trajectory and expected driving trajectory of the surrounding vehicle is the first threshold value or more or a cumulative addition of the trajectory errors is the second threshold value or more and a state of the passenger detected by the sensor unit 500 does not correspond to the forward looking state, the processor 610 may turn off the autonomous driving mode in order to induce the manual driving of the passenger. After the autonomous driving mode is turned off, the processor 610 may control one or more of the driving of the ego vehicle and communication with an external organization based on a state of the passenger detected by the sensor unit 500.

An operation of the processor 610 to control the driving of the ego vehicle and communication with an external organization based on the state of the passenger after the autonomous driving mode of the ego vehicle is turned off is described. If a manual driving manipulation of the passenger is not performed after the autonomous driving mode of the ego vehicle is turned off, the processor 610 may change the driving mode of the ego vehicle to an emergency autonomous driving mode so that the ego vehicle can move to a specific point necessary for the passenger. That is, although the autonomous driving mode has been turned off, if a manual driving manipulation of the passenger is not detected through the steering angle sensor 210 or APS/PTS 220 of the driving information detector 200, the processor 610 may primarily determine that an emergency situation has occurred in the passenger, and may control the low-ranking control system 400 by changing the driving mode of the ego vehicle to the emergency autonomous driving mode so that the ego vehicle moves to a specific point (e.g., a nearby hospital, an emergency room, a service station or a rest area) necessary for the passenger.

Furthermore, if a behavior of the passenger is not detected through the sensor unit 500 or the bio signal of the passenger detected by the sensor unit 500 is formed in a pattern different from that of a normal bio signal previously stored in the memory 620 as a bio signal in the normal physical condition of the passenger, the processor 610 may transmit a rescue signal to an external organization.

That is, if a behavior of the passenger is not detected by the internal camera sensor 535 provided within the sensor unit 500 (i.e., the passenger does not move) or a bio signal (e.g., a pulse beat or a body temperature) of the passenger detected by a bio sensor provided within the sensor unit 500 is formed in a pattern different from that of the normal bio signal, the processor 610 may determine that an emergency situation has occurred in the passenger, and may transmit a rescue signal to an external organization (e.g., a nearby hospital, a fire station or a police station) necessary for the passenger.

Figure 7:
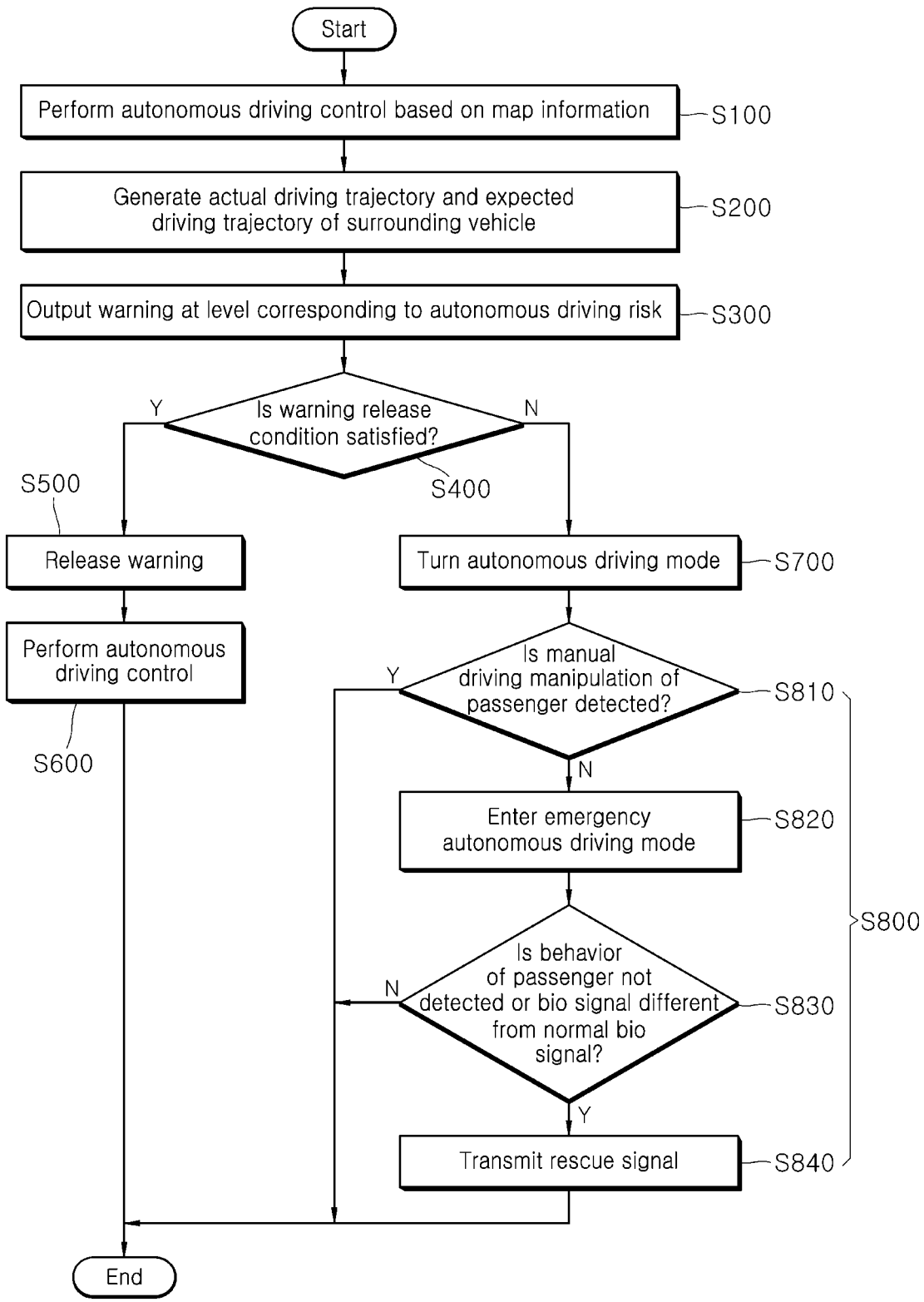
FIG. 7 is a flowchart for describing an autonomous driving method according to an exemplary embodiment of the present invention.
Figure 8:
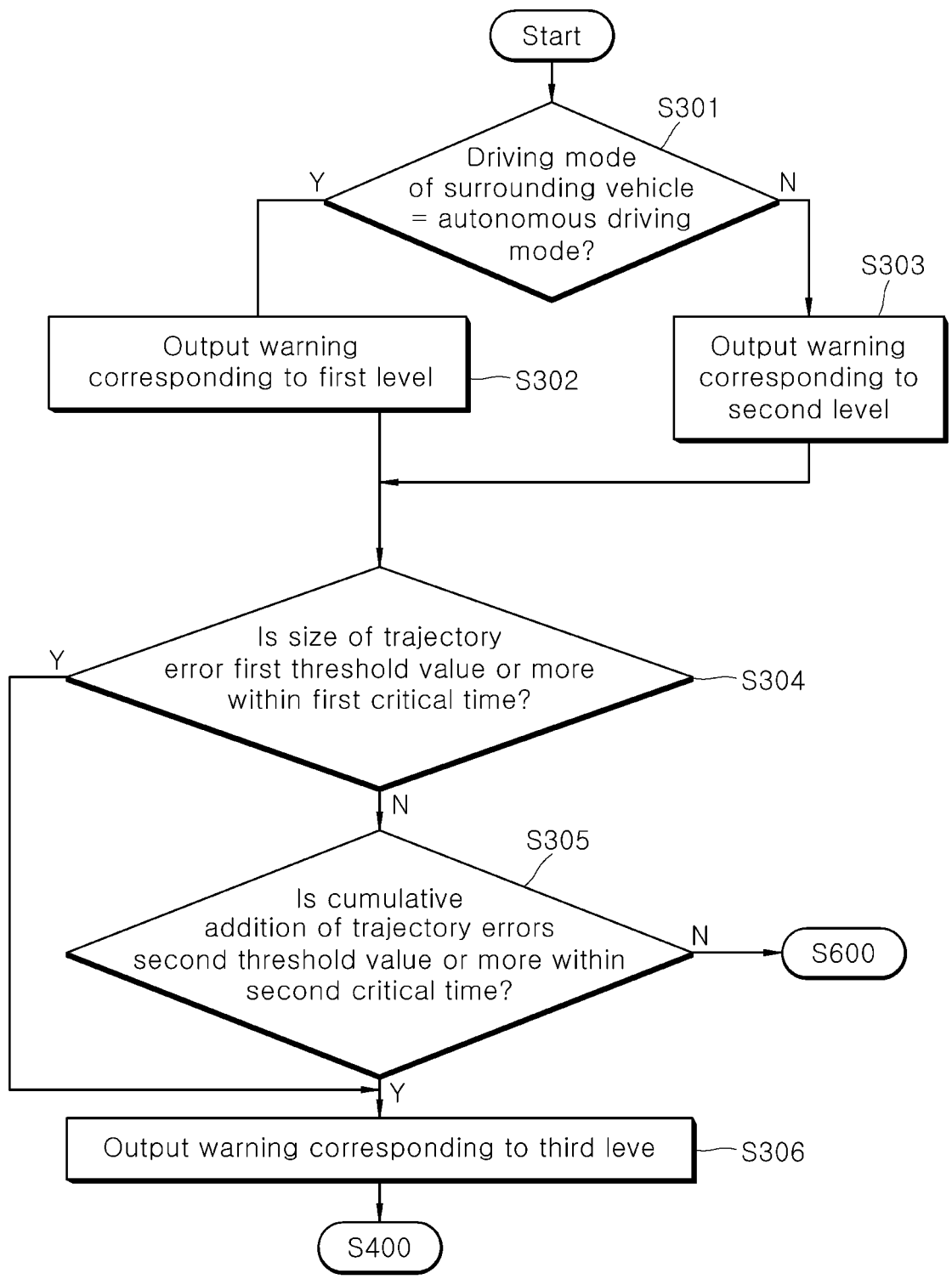
FIG. 8 is a flowchart for concretely describing the step of outputting a warning according to a first exemplary embodiment of the present invention.

FIG. 7 is a flowchart for describing an autonomous driving method according to a first exemplary embodiment of the present invention. FIG. 8 is a flowchart for concretely describing the step of outputting a warning in the autonomous driving method according to the first exemplary embodiment of the present invention.

The autonomous driving method according to the first exemplary embodiment of the present invention is described with reference to FIG. 7. First, the processor 610 controls the autonomous driving of an ego vehicle based on map information stored in the memory 620 (S100).

Furthermore, the processor 610 generates an actual driving trajectory and expected driving trajectory of a surrounding vehicle around the ego vehicle based on driving information of the surrounding vehicle detected by the sensor unit 500 and map information stored in the memory 620 (S200).

Furthermore, the processor 610 determines an autonomous driving risk of the ego vehicle based on whether a driving mode of the surrounding vehicle is the autonomous driving mode and a trajectory error between the actual driving trajectory and expected driving trajectory of the surrounding vehicle, and outputs a warning to a passenger through the output unit 300 at a level corresponding to the determined autonomous driving risk (S300). At step S300, the processor 610 may output the warnings to the passenger through the output unit 300 as first to third levels based on ascending order of autonomous driving risk of the ego vehicle.

Step S300 is described in detail with reference to FIG. 8. The processor 610 determines the driving mode of the surrounding vehicle (S301). If, as a result of the determination, the driving mode of the surrounding vehicle is the autonomous driving mode, the processor 610 outputs, to the passenger, a warning corresponding to the first level through the output unit 300 (S302). If, as a result of the determination at step S301, the driving mode of the surrounding vehicle is the manual driving mode, the processor 610 outputs, to the passenger, a warning corresponding to the second level through the output unit 300 (S303).

After step S302 or S303, the processor 610 performs the diagnosis of reliability of autonomous driving control over the ego vehicle based on the size of the trajectory error between the actual driving trajectory and expected driving trajectory of the surrounding vehicle or a cumulative addition of the trajectory errors. If, as a result of the execution of the diagnosis, it is determined that the autonomous driving control over the ego vehicle is unreliable, the processor 610 outputs, to the passenger, a warning corresponding to the third level through the output unit 300.

Specifically, when the state in which the size of the trajectory error between the actual driving trajectory and expected driving trajectory of the surrounding vehicle is a preset first threshold value or more occurs within a preset first critical time (S304) or the state in which a cumulative addition of the trajectory errors is a preset second threshold value or more occurs within a second critical time preset as a value greater than the first critical time in the state in which the size of the trajectory error is less than the first threshold value for the first critical time (S305), the processor 610 determines that the autonomous driving control over the ego vehicle is unreliable, and outputs, to the passenger, the warning corresponding to the third level through the output unit 300 (S306). If the state in which the cumulative addition is the second threshold value or more does not occur at step S305, the processor 610 performs normal autonomous driving control (S600).

After step S300, if it is determined that the size of the trajectory error between the actual driving trajectory and expected driving trajectory of the surrounding vehicle becomes less than the first threshold value or the cumulative addition of the trajectory errors becomes less than the second threshold value or a state of the passenger detected by the sensor unit 500 is a forward looking state (S400) (when a warning release condition in FIG. 7 is satisfied), the processor 610 releases the warning output through the output unit 300 (S500) and performs normal autonomous driving control (S600).

In contrast, after step S300, if it is determined that the state of the passenger detected by the sensor unit 500 does not correspond to the forward looking state in the state in which the size of the trajectory error is the first threshold value or more or the cumulative addition of the trajectory errors is the second threshold value or more (S400) (when the warning release condition in FIG. 7 is not satisfied), the processor 610 turns off the autonomous driving mode (S700).

After step S700, the processor 610 controls one or more of the driving of the ego vehicle and communication with an external organization based on a state of the passenger detected by the sensor unit 500 (S800).

At step S800, if a manual driving manipulation of the passenger is not performed (S810), the processor 610 changes the driving mode of the ego vehicle to the emergency autonomous driving mode so that the ego vehicle can move to a specific point necessary for the passenger (S820). Furthermore, when a behavior of the passenger is not detected by the sensor unit 500 or a bio signal of the passenger detected by the sensor unit 500 is formed in a pattern different from that of a normal bio signal previously stored in the memory 620 as a bio signal in the normal physical condition of the passenger (S830), the processor 610 transmits a rescue signal to an external organization (S840).

According to the first exemplary embodiment, a passenger is warned through an output device, such as a speaker or display device applied to an autonomous vehicle, by taking into consideration both an autonomous driving risk attributable to an external factor, determined through a process of determining whether a driving mode of a surrounding vehicle around an ego vehicle is the autonomous driving mode, and an autonomous driving risk attributable to an internal factor, determined through a process of performing the diagnosis of reliability of autonomous driving control over the ego vehicle. Accordingly, the passenger can accurately recognize an autonomous driving state of the ego vehicle and take suitable follow-up measures, thereby improving the driving stability and driving accuracy of the autonomous vehicle. Furthermore, an emergency situation occurred in the passenger can be effectively handled by controlling emergency driving of the ego vehicle and the transmission of a rescue signal to an external organization based on a state of the passenger after the autonomous driving mode of the ego vehicle is turned off.

The present disclosure includes a second exemplary embodiment which may be applied along with the first exemplary embodiment. Hereinafter, the second exemplary embodiment in which an autonomous driving algorithm applied to autonomous driving control is learnt is described. Hereinafter, in order to clearly distinguish between terms, an "autonomous driving algorithm" is used to mean an algorithm applied to autonomous driving control of an ego vehicle, and a "surrounding vehicle autonomous-driving algorithm" is used to mean an algorithm applied to autonomous driving control of a surrounding vehicle. The second exemplary embodiment is implemented as a process of updating the autonomous driving algorithm applied to an ego vehicle and a process of learning the autonomous driving algorithm applied to the ego vehicle based on a comparison between the accuracy of the autonomous driving algorithm applied to the ego vehicle and the accuracy of the surrounding vehicle autonomous-driving algorithm applied to the surrounding vehicle. The processes are described in detail below.

First, the processor 610 may control the autonomous driving of an ego vehicle based on map information and autonomous driving algorithm stored in the memory 620, and may receive a surrounding vehicle autonomous-driving algorithm from a surrounding vehicle through V2V communication in an autonomous driving control process for the ego vehicle. In this case, the processor 610 may determine whether the update of the autonomous driving algorithm stored in the memory 620 is necessary, by comparing the autonomous driving algorithm stored in the memory 620 and the surrounding vehicle autonomous-driving algorithm received from the surrounding vehicle.

In the present exemplary embodiment, a first accuracy index indicative of autonomous driving control accuracy for the ego vehicle may have been mapped to the autonomous driving algorithm. A second accuracy index indicative of autonomous driving control accuracy for the surrounding vehicle may have been mapped to the surrounding vehicle autonomous-driving algorithm. The accuracy index is a quantitative index calculated based on a history in which autonomous driving control over a vehicle has been performed based on the autonomous driving algorithm. For example, the accuracy index may mean an index calculated to indicate control accuracy of the autonomous driving algorithm by synthetically taking into consideration frequency of an accident that occurs when autonomous driving control has been performed based on the autonomous driving algorithm, time taken to reach a destination, mileage and fuel efficiency, and frequency of driving manipulation involved by a passenger. An algorithm for calculating the accuracy index through the analysis of accumulated histories in which autonomous driving control has been performed based on the autonomous driving algorithm may also be stored in the memory 620. The calculated accuracy index may be mapped to the autonomous driving algorithm and then stored in the memory 620.

Accordingly, when the second accuracy index mapped to the surrounding vehicle autonomous-driving algorithm is greater than the first accuracy index mapped to the autonomous driving algorithm, the processor 610 may update the autonomous driving algorithm by storing the surrounding vehicle autonomous-driving algorithm in the memory 620. That is, when the second accuracy index is greater than the first accuracy index, the surrounding vehicle autonomous-driving algorithm may be considered as having higher accuracy and reliability than the autonomous driving algorithm. Accordingly, the processor 610 may update the autonomous driving algorithm by storing the surrounding vehicle autonomous-driving algorithm in the memory 620. The update of the autonomous driving algorithm may be performed in real time or periodically in a process of controlling autonomous driving of an ego vehicle.

Through such an update, the processor 610 may determine whether driving manipulation of the passenger of the ego vehicle has been involved in a process of controlling the autonomous driving of the ego vehicle based on an autonomous driving algorithm now stored in the memory 620 (i.e., an autonomous driving algorithm previously stored in the memory 620 or a surrounding vehicle autonomous-driving algorithm received from a surrounding vehicle). In this case, the processor 610 may determine whether the manual driving manipulation, such as a steering manipulation, acceleration pedal manipulation or brake pedal manipulation of the passenger, has been involved, through the steering angle sensor 210 or APS/PTS 220 of the driving information detector 200. If it is determined that the driving manipulation of the passenger has been involved, the learning of the autonomous driving algorithm to be described later may be performed. The processor 610 may stop autonomous driving control over the ego vehicle (i.e., may turn off the autonomous driving mode of the ego vehicle) as a prerequisite for learning the autonomous driving algorithm.

After the driving manipulation of a passenger is involved and the autonomous driving control is stopped, the processor 610 may enable the learning of the autonomous driving algorithm, now stored in the memory 620, to be performed by taking into consideration the driving manipulation of the passenger. Specifically, the processor 610 may enable the learning of the autonomous driving algorithm to be performed based on a result of a comparison between the driving manipulation of the passenger and a control process according to the autonomous driving algorithm at timing at which the driving manipulation of the passenger is involved. Examples of the control process and the driving manipulation of the passenger may include i) a case where the control process is a lane change process performed through right steering and deceleration and the driving manipulation of the passenger includes right steering for a steering wheel and stepping on a brake pedal, ii) a case where the control process is a lane change process performed through right steering and deceleration and the driving manipulation of the passenger includes left steering for the steering wheel and stepping on the brake pedal, or iii) a case where the control process is a lane change process performed through right steering and deceleration and the driving manipulation of the passenger includes left steering for the steering wheel and stepping on the acceleration pedal.

In the above examples, as in the case of i), if the control process and the driving manipulation of the passenger are the same, the processor 610 may return to the autonomous driving mode again, and may perform autonomous driving control over the ego vehicle based on an autonomous driving algorithm now stored in the memory 620. In the above examples, as in the case of ii) and iii), if the control process and the driving manipulation of the passenger are different, the processor 610 may verify the risk of the driving manipulation of the passenger and then enable the learning of the autonomous driving algorithm to be performed. The risk of the driving manipulation of the passenger may be verified through a process of determining whether an accident has been caused due to the driving manipulation of the passenger. In the case ii) of the above examples, if an accident has not been caused by the left steering and stepping on the brake pedal by the passenger, the processor 610 may determine that the risk of the driving manipulation of the passenger has been verified, and may enable the learning of the autonomous driving algorithm to be performed based on the driving manipulation of the passenger. In the case iii of the above examples, if an accident has been caused by the left steering and stepping on the acceleration pedal by the passenger, the processor 610 may determine that the risk of the driving manipulation of the passenger has not been verified, may return to the autonomous driving mode again, and may perform autonomous driving control over the ego vehicle based on an autonomous driving algorithm now stored in the memory 620.

In a case where the control process and the driving manipulation of the passenger are different, if the risk of the driving manipulation of the passenger has been verified, the processor 610 may enable the learning of an autonomous driving algorithm to be performed based on information on the surrounding object detected by the sensor unit 500, driving information of the ego vehicle detected by the driving information detector 200, the control process, and driving manipulation of the passenger. That is, the processor 610 may enable the learning of the autonomous driving algorithm to be performed based on a prepared control process and driving manipulation of the passenger whose risk has been verified according to the autonomous driving algorithm. Furthermore, the processor 610 may enable the learning of the autonomous driving algorithm to be performed by taking into consideration both information on the surrounding object detected by the sensor unit 500 and driving information of the ego vehicle detected by the driving information detector 200 so that active autonomous driving control over a surrounding environment and driving state of the ego vehicle is performed.

The processor 610 may autonomously perform the learning of an autonomous driving algorithm. However, in consideration of a computational load of the learning, the processor 610 may transmit, to the server 700, information on a surrounding object, driving information of an ego vehicle, a control process, and driving manipulation of a passenger so that the training of the autonomous driving algorithm is performed by the server 700, may receive, from the server 700, the autonomous driving algorithm whose training has been completed by the server 700, and may control the autonomous driving of the ego vehicle. Furthermore, the processor 610 may propagate, to the surrounding vehicle, the autonomous driving algorithm whose learning has been completed and which is received from the server 700, in order to share the autonomous driving algorithm with the surrounding vehicle.

Figure 9:
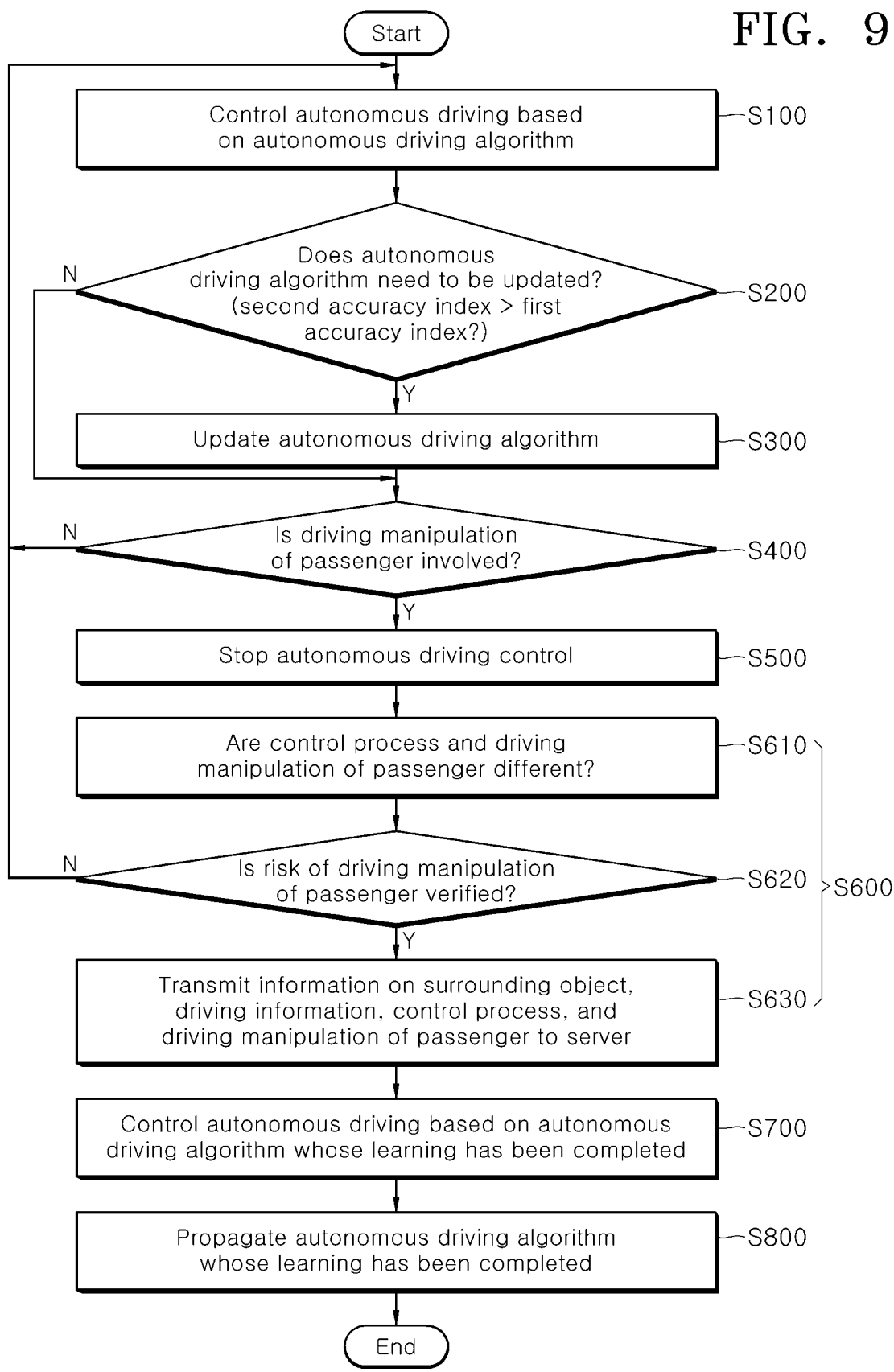
FIG. 9 is a flowchart for describing an autonomous driving method according to a second exemplary embodiment of the present invention.

FIG. 9 is a flowchart for describing the autonomous driving method according to the second exemplary embodiment of the present invention.

The autonomous driving method according to the second exemplary embodiment of the present invention is described with reference to FIG. 9. First, the processor 610 controls autonomous driving of an ego vehicle based on an autonomous driving algorithm stored in the memory 620 (S100).

Next, the processor 610 determines whether to update the autonomous driving algorithm stored in the memory 620, by comparing the autonomous driving algorithm stored in the memory 620 with a surrounding vehicle autonomous-driving algorithm received from a surrounding vehicle (S200). As described above, a first accuracy index indicative of autonomous driving control accuracy for the ego vehicle has been mapped to the autonomous driving algorithm. A second accuracy index indicative of autonomous driving control accuracy for the surrounding vehicle has been mapped to the surrounding vehicle autonomous-driving algorithm. When the second accuracy index mapped to the surrounding vehicle autonomous-driving algorithm is greater than the first accuracy index mapped to the autonomous driving algorithm at step S200, the processor 610 determines that the update of the autonomous driving algorithm is necessary.

If it is determined at step S200 that the update of the autonomous driving algorithm is necessary, the processor 610 updates the autonomous driving algorithm by storing the surrounding vehicle autonomous-driving algorithm in the memory 620 (S300).

Next, the processor 610 determines whether driving manipulation of a passenger has been involved in a process of controlling the autonomous driving of the ego vehicle based on the autonomous driving algorithm now stored in the memory 620 through the update (S400).

If it is determined at step S400 that the driving manipulation of the passenger has been involved, the processor 610 stops autonomous driving control over the ego vehicle (S500).

Thereafter, the processor 610 enables the learning of the autonomous driving algorithm, now stored in the memory 620, to be performed by taking into consideration the driving manipulation of the passenger. Specifically, the processor 610 enables the learning of the autonomous driving algorithm to be performed based on a result of a comparison between the driving manipulation of the passenger and a control process according to the autonomous driving algorithm at timing at which the driving manipulation of the passenger is involved (S600).

At step S600, the processor 610 compares the driving manipulation of the passenger with the control process according to the autonomous driving algorithm at the timing at which the driving manipulation of the passenger is involved (S610), verifies the risk of the driving manipulation of the passenger if the control process and the driving manipulation of the passenger are different (S620), and enables the learning of the autonomous driving algorithm to be performed based on the control process and the driving manipulation of the passenger if the risk of the driving manipulation of the passenger has been verified (S630). At step S630, the processor 610 may enable the learning of the autonomous driving algorithm to be performed by further taking into consideration information on a surrounding object around the ego vehicle and driving information of the ego vehicle. The processor 610 may transmit, to the server 700, the information on the surrounding object, the driving information of the ego vehicle, the control process, and the driving manipulation of the passenger so that the learning of the autonomous driving algorithm is performed by the server 700.

Thereafter, the processor 610 receives, from the server 700, the autonomous driving algorithm whose learning is performed by the server 700, controls the autonomous driving of the ego vehicle (S700), and propagates, to the surrounding vehicle, the autonomous driving algorithm whose learning has been completed and which is received from the server 700, in order to share the autonomous driving algorithm with the surrounding vehicle (S800).

According to the second exemplary embodiment, the driving stability and driving accuracy of an autonomous vehicle can be improved by learning an autonomous driving algorithm, applied to autonomous driving control, by taking into consideration driving manipulation of a passenger involved in an autonomous driving control process for an ego vehicle and then controlling the autonomous driving of the ego vehicle based on the autonomous driving algorithm whose learning has been completed.

The present disclosure includes a third exemplary embodiment which may be applied along with the first and second exemplary embodiments. Hereinafter, the third exemplary embodiment in which the state of a device within an ego vehicle is controlled based on an internal control mode set by a passenger in the autonomous driving process of the ego vehicle is described.

First, the processor 610 may control the autonomous driving of an ego vehicle based on map information stored in the memory 620. In this case, the processor 610 may generate an expected driving trajectory and actual driving trajectory of a surrounding vehicle based on the map information stored in the memory 620 and driving information of the surrounding vehicle detected by the sensor unit 500, may update the map information, stored in the memory 620, using new map information received from the server 700, when a trajectory error between the expected driving trajectory and actual driving trajectory of the surrounding vehicle is a preset threshold value or more, and may control the autonomous driving of the ego vehicle based on the updated map information.

Specifically, as described above, (the driving trajectory generation module 612 of) the processor 610 may generate the expected driving trajectory of the surrounding vehicle based on the map information stored in the memory 620. In this case, the processor 610 may generate the expected driving trajectory of the surrounding vehicle as the middle line of a lane incorporated into the map information stored in the memory 620.

Furthermore, (the driving trajectory generation module 612 of) the processor 610 may generate the actual driving trajectory of the surrounding vehicle based on the driving information of the surrounding vehicle detected by the sensor unit 500. That is, when the surrounding vehicle is detected at a specific point by the sensor unit 500, the processor 610 may specify the location of the surrounding vehicle currently detected in the map information by making cross reference to the location of the detected surrounding vehicle and a location in the map information stored in the memory 620, and may generate the actual driving trajectory of the surrounding vehicle by continuously monitoring the location of the surrounding vehicle as described above.

After the expected driving trajectory and actual driving trajectory of the surrounding vehicle are generated, when the trajectory error between the expected driving trajectory and actual driving trajectory of the surrounding vehicle is the preset threshold value or more, the processor 610 may determine that the map information stored in the memory 620 is inaccurate. Accordingly, processor 610 may update the map information, stored in the memory 620, using new map information received from the server 700. Accordingly, the processor 610 may control the autonomous driving of the ego vehicle based on the updated map information, that is, the new map information. Such a process of updating the map information stored in the memory 620 functions as the prerequisite process of performing a configuration for controlling the state of an internal device according to an in-vehicle mode, which is described hereinafter, in the state which a driving risk of an ego vehicle is low.

In a process of controlling the autonomous driving of an ego vehicle, the processor 610 may determine a driving risk of the ego vehicle based on a surrounding vehicle detected by the sensor unit 500. The driving risk may mean a quantitative index indicative of a collision risk between the ego vehicle and the surrounding vehicle. In this case, the processor 610 may determine the driving risk of the ego vehicle based on the number of surrounding vehicles located within a preset first distance from the ego vehicle. The first distance may be selected in various ways by taking into consideration a designer's intention and the specifications of the ego vehicle. When the driving risk is determined, the processor 610 may determine a current driving risk of the ego vehicle by determining whether the determined driving risk is smaller than a preset critical risk. Furthermore, the critical risk may be selected in various ways depending on a designer's intention. For example, such a configuration may be implemented as an embodiment in which the driving risk of the ego vehicle is determined in such a manner that the number of surrounding vehicles (e.g., 8) itself located within the first distance from the ego vehicle is determined as a driving risk and it is determined whether the determined critical risk is smaller than a critical risk (e.g., 5) having a specific value or may be implemented as an embodiment in which the driving risk of the ego vehicle is determined in such a manner that a driving risk is determined by dividing the driving risk into a plurality of levels (e.g., first to third levels) based on the number of surrounding vehicles located within the first distance from the ego vehicle and it is determined whether the determined critical risk is smaller than a critical risk (e.g., the second level) having a specific level value.

If it is determined that the driving risk of the ego vehicle determined as described above is the critical risk or more, the processor 610 may determine that a current driving risk of the ego vehicle is high, and may perform a process of reducing the current driving risk of the ego vehicle before controlling an internal device based on an internal control mode to be described later. To this end, the processor 610 may control the autonomous driving of the ego vehicle so that the ego vehicle follows the driving of a driving group which is located within a preset second distance from the ego vehicle and configured with a plurality of group vehicles. For example, if a driving group configured with a plurality of group vehicles located within the second distance from the ego vehicle is present and the driving path of the driving group overlaps a driving path up to the destination of the ego vehicle, the processor 610 may control the autonomous driving of the ego vehicle so that the ego vehicle follows the driving of the driving group. Accordingly, the ego vehicle follows the driving of the driving group, thereby solving a corresponding driving risk. Accordingly, the driving risk of the ego vehicle can be reduced to a value smaller than a critical risk (if an ego vehicle follows the driving of a driving group, logic for setting a driving risk of the ego vehicle as a value smaller than a critical risk may have been implemented in the processor 610).

In the state in which the driving risk of the ego vehicle has been set to have a value smaller than the critical risk through the aforementioned process, the processor 610 may control the state of an internal device based on an in-vehicle mode set by a passenger. That is, if an environment in which the ego vehicle can safely travel has been formed as the driving risk of the ego vehicle has become smaller than the critical risk, the passenger may escape from autonomous driving monitoring for the ego vehicle and want to take another action (e.g., a break or watching movies) in some cases. If the passenger sets an in-vehicle mode for taking a desired action through the display device 320, the processor 610 may operate to support an action of the passenger by controlling the state of an internal device based on the set in-vehicle mode. As described above, the internal device may include a vehicle seat, a lighting device and the display device 320. The in-vehicle mode may include a break mode (e.g., a passenger's reading or sleeping) and an entertainment mode (e.g., watching TV or movies through the display device 320).

The processor 610 may control one or more of the angle of the vehicle seat, the illuminance of the lighting device, and the angle of the display device 320 based on an in-vehicle mode. For example, if the in-vehicle mode has been set as the break mode, the processor 610 may adjust the angle of the vehicle seat to a preset angle (e.g., first angle) in accordance with the break mode so that the passenger takes a break through sleeping, and may control the illuminance of the lighting device through a method of controlling the illuminance of each of an internal light and a mood light or turning off the internal light and turning on the mood light so that a proper break environment is provided to the passenger. Furthermore, if the in-vehicle mode has been set as the entertainment mode, the processor 610 may adjust the angle of the vehicle seat to a preset angle (e.g., second angle) in accordance with the entertainment mode so that a proper environment in which the passenger can watch movies through the display device 320 is provided, may determine a driver's viewing angle using a facial image of the driver obtained through the internal camera sensor 535, and may control the angle of the display device 320 based on the determined viewing angle so that the passenger's eyes is matched with the image output direction of the display device 320. Furthermore, when the in-vehicle mode is the break mode or the entertainment mode, the processor 610 may limit a lane change and control the autonomous driving of the ego vehicle so that the ego vehicle travels at a constant speed, in order to hinder the passenger's break or entertainment activity.

In the process of controlling the autonomous driving of the ego vehicle based on the break mode or the entertainment mode, the processor 610 may continue to determine the driving risk. If it is determined that a driving risk determined in this process is a critical risk or more, the processor 610 may output a warning to the passenger through the output unit 300 so that the passenger stops a break or entertainment activity and recognizes a need to monitor autonomous driving control over the ego vehicle. In some embodiments, if it is determined that a driving risk is a critical risk or more, the processor 610 may control the low-ranking control system 400 so that the ego vehicle moves to a nearby stop point (e.g., the shoulder, a service station or a rest area). If the driving risk becomes less than the critical risk after the ego vehicle moves to the stop point, the processor 610 may operate to reinitiate autonomous driving control over the ego vehicle.

As described above, if it is determined that the driving risk of the ego vehicle is the critical risk or more, the processor 610 may control the autonomous driving of the ego vehicle so that the ego vehicle follows the driving of the driving group which is located within the preset second distance from the ego vehicle and configured with a plurality of group vehicles. If it is determined that a state of the passenger detected by the sensor unit 500 is an abnormal state in the process of controlling the group driving of the ego vehicle, the processor 610 may control the group driving of the ego vehicle by taking into consideration a rank of the ego vehicle in the driving group.

Specifically, (the passenger state determination module 616 of) the processor 610 may determine that the state of the passenger is an abnormal state (i.e., an abnormal body state), based on a state or bio signal of the passenger detected by the internal camera sensor 535 or bio sensor of the sensor unit 500 in the group driving process of the ego vehicle. In this case, the processor 610 may convert the results of the state of the passenger, detected by the sensor unit 500, into a quantitative value, and may determine whether the state of the passenger is an abnormal state, using a method of determining whether the converted quantitative value is less than a defined critical value (e.g., the critical value may be previously stored by taking into consideration the results of the passenger in a normal state, detected by the sensor unit).

In this case, if it is determined that the state of the passenger detected by the sensor unit 500 is an abnormal state, the processor 610 may control the group driving of the ego vehicle by taking into consideration a rank of the ego vehicle in the driving group.

Specifically, as a case where the state of the passenger is an abnormal state, if the ego vehicle has a leader vehicle rank in the driving group, the processor 610 may assign the leader vehicle rank to a follower vehicle just behind the ego vehicle and then control the group driving of the ego vehicle so that the ego vehicle leaves the driving group. That is, as a case where the ego vehicle has a leader vehicle rank in the driving group, if the state of the passenger of the ego vehicle is an abnormal state, the leader vehicle rank of the ego vehicle may be assigned to another group vehicle in order to secure the safety of group driving. To this end, the processor 610 may assign the leader vehicle rank of the ego vehicle to a follower vehicle just behind the ego vehicle and then control the group driving of the ego vehicle so that the ego vehicle leaves the driving group. After the ego vehicle leaves the driving group, the processor 610 may control the autonomous driving of the ego vehicle so that the ego vehicle moves to a specific point (e.g., a hospital, a service station or a rest area) necessary for the passenger.

Furthermore, as a case where the state of the passenger is an abnormal state, if the ego vehicle has a follower vehicle rank in the driving group, the processor 610 may control group driving of the ego vehicle so that the ego vehicle is located at the rearmost within the driving group. That is, as a case where the ego vehicle has a follower vehicle rank within the driving group, if the state of the passenger of the ego vehicle is an abnormal state, the processor 610 may control the group driving of the ego vehicle so that the ego vehicle is located at the rearmost of the driving group so as for the ego vehicle to rapidly leave the driving group. After the ego vehicle is located at the rearmost of the driving group and leaves the driving group, the processor 610 may control the autonomous driving of the ego vehicle so that the ego vehicle moves to a specific point (e.g., a hospital, a service station or a rest area) necessary for the passenger.

Furthermore, if it is determined that the state of the passenger is a break state, such as a sleep state, not an abnormal body state, when the ego vehicle arrives at a destination, the processor 610 may output an alarm through the output unit 300 so that the passenger can recognize the arrival at the destination.

Figure 10:
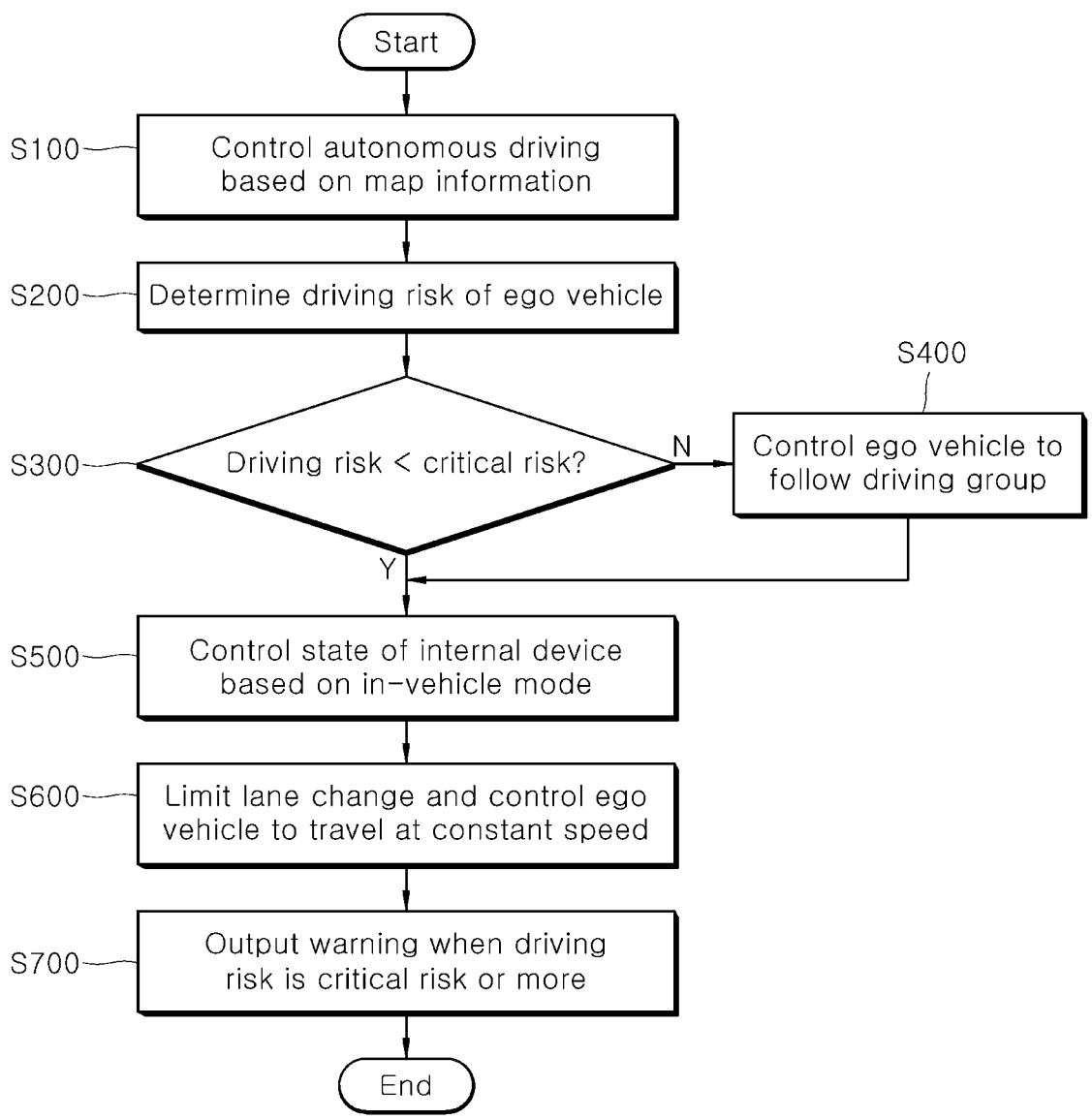
FIG. 10 is a flowchart for describing an autonomous driving method according to a third exemplary embodiment of the present invention.

FIG. 10 is a flowchart for describing the autonomous driving method according to the third embodiment of the present disclosure.

The autonomous driving method according to the third exemplary embodiment of the present invention is described with reference to FIG. 10. First, the processor 610 controls the autonomous driving of an ego vehicle based on map information stored in the memory 620 (S100).

At step S100, the processor 610 may generate an expected driving trajectory and actual driving trajectory of a surrounding vehicle based on the map information stored in the memory 620 and driving information of the surrounding vehicle detected by the sensor unit 500. When a trajectory error between the expected driving trajectory and actual driving trajectory of the surrounding vehicle is a preset threshold value or more, the processor 610 may update the map information, stored in the memory 620, using new map information received from the server 700, and may control the autonomous driving of the ego vehicle based on the updated map information.

In the process of controlling the autonomous driving at step S100, the processor 610 determines a driving risk of the ego vehicle based on a surrounding vehicle detected by the sensor unit 500 (S200). At step S200, the processor 610 may determine the driving risk of the ego vehicle based on the number of surrounding vehicles located within a preset first distance from the ego vehicle.

Next, the processor 610 compares the driving risk, determined at step S200, with a preset critical risk (S300).

If it is determined at step S300 that the driving risk of the ego vehicle is the critical risk or more, the processor 610 controls the autonomous driving of the ego vehicle so that the ego vehicle follows the driving of a driving group which is located within a preset second distance from the ego vehicle and configured with a plurality of group vehicles (S400). If a driving group is not present within the second distance from the ego vehicle at step S400, the processor 610 may control the setting of the break mode and entertainment mode, performed by a passenger through the display device 320, to be limited so that the monitoring state of the passenger for autonomous driving control can be maintained.

If it is determined at step S300 that the driving risk of the ego vehicle is less than the critical risk or if the autonomous driving of the ego vehicle is controlled at step S400 so that the ego vehicle follows the driving of the driving group, the processor 610 controls the state of an internal device based on an in-vehicle mode set by the passenger (S500). As described above, the internal device may include a vehicle seat, a lighting device and the display device 320 which are installed within the ego vehicle and have states controlled by a manipulation of the passenger in order to support the passenger's driving or convenience (e.g., a break or entertainment activity). The in-vehicle mode may include a break mode and an entertainment mode. At step S500, the processor 610 may control one or more of the angle of the vehicle seat, the illuminance of the lighting device and the angle of the display device 320 based on an in-vehicle mode. After step S500, step S600 in which the processor 610 limits a lane change and controls the autonomous driving of the ego vehicle so that the ego vehicle travels at a constant speed may be further performed.

If it is determined that a driving risk determined in the process of controlling the autonomous driving of the ego vehicle based on the break mode or the entertainment mode is the critical risk or more, the processor 610 outputs a warning to the passenger through the output unit 300 (S700). At step S700, the processor 610 may control the low-ranking control system 400 so that the ego vehicle moves to a nearby stop point. After the ego vehicle moves to the stop point, when the driving risk becomes less than the critical risk, the processor 610 may operate to reinitiate autonomous driving control over the ego vehicle.

If it is determined after step S400 that a state of the passenger detected by the sensor unit 500 is an abnormal state, the processor 610 may control the group driving of the ego vehicle by taking into consideration a rank of the ego vehicle in a driving group. Specifically, as a case where the state of the passenger is an abnormal state, if the ego vehicle has a leader vehicle rank in the driving group, the processor 610 may assign the leader vehicle rank to a follower vehicle just behind the ego vehicle, and may control the group driving of the ego vehicle so that the ego vehicle leaves the driving group. As a case where the state of the passenger is an abnormal state, if the ego vehicle has a follower vehicle rank in the driving group, the processor 610 may control the group driving of the ego vehicle so that the ego vehicle is located at the rearmost within the driving group.

According to the third exemplary embodiment, a passenger's convenience can be improved by controlling the state of a device within an ego vehicle based on an internal control mode set by a passenger in the autonomous driving process of the ego vehicle. The driving stability of the ego vehicle can be secured by performing state control of a device within the ego vehicle in the state in which a driving risk of the ego vehicle is low.

It is to be noted that the steps included in the autonomous driving methods of the first to third exemplary embodiments are independent from one another and have the same reference numeral (S000) in the drawings, but are different steps.

According to the first exemplary embodiment, a warning is output to a passenger through an output device, such as a speaker or display device applied to an autonomous vehicle, by taking into consideration both an autonomous driving risk attributable to an external factor, determined through a process of determining whether a driving mode of a surrounding vehicle around an ego vehicle is the autonomous driving mode, and an autonomous driving risk attributable to an internal factor, determined through a process of performing the diagnosis of reliability of autonomous driving control over the ego vehicle. Accordingly, the passenger can accurately recognize an autonomous driving state of the ego vehicle and take suitable follow-up measures, thereby improving the driving stability and driving accuracy of the autonomous vehicle. Furthermore, an emergency situation occurring in the passenger can be effectively handled by controlling emergency driving of the ego vehicle and the transmission of a rescue signal to an external organization based on a state of the passenger after the autonomous driving mode of the ego vehicle is turned off.

According to the second exemplary embodiment, the driving stability and driving accuracy of an autonomous vehicle can be improved by learning an autonomous driving algorithm applied to autonomous driving control by taking into consideration driving manipulation of a passenger involved in an autonomous driving control process for an ego vehicle and then controlling the autonomous driving of the ego vehicle based on the autonomous driving algorithm whose learning has been completed.

According to the third exemplary embodiment, a passenger's convenience can be improved by controlling the state of a device within an ego vehicle based on an internal control mode set by a passenger in the autonomous driving process of the ego vehicle. The driving stability of the ego vehicle can be secured by performing state control over the device within the ego vehicle in the state in which a driving risk of the ego vehicle is low.

Although exemplary embodiments of the present invention have been disclosed for illustrative purposes, those skilled in the art will appreciate that various modifications, additions and substitutions are possible, without departing from the scope and spirit of the inventive concepts as defined in the accompanying claims. Thus, the true technical scope of the inventive concepts should be defined by the following claims.

What is claimed is:

1. An autonomous driving apparatus comprising:
   a sensor unit configured to detect a surrounding vehicle around an ego vehicle that autonomously travels and to detect a state of a passenger within the ego vehicle;
   an output unit;
   a memory configured to store map information; and
   a processor configured to control the autonomous driving of the ego vehicle based on the map information stored in the memory,
   wherein:
   the processor is configured to:
   generate an actual driving trajectory and an expected driving trajectory of the surrounding vehicle based on driving information of the surrounding vehicle detected by the sensor unit and the map information stored in the memory, respectively;

determine whether a driving mode of the surrounding vehicle is an autonomous driving mode and an autonomous driving risk of the ego vehicle based on a trajectory error between the actual driving trajectory and expected driving trajectory of the surrounding vehicle;

output a warning to a passenger through the output unit at a level corresponding to the determined autonomous driving risk;

release the warning output through the output unit, when the state of the passenger detected by the sensor unit is a forward looking state after outputting the warning to the passenger through the output unit;

output the warnings to the passenger through the output unit as first to third levels based on ascending order of autonomous driving risk of the ego vehicle;

perform diagnosis of reliability of autonomous driving control over the ego vehicle based on a size of the trajectory error between the actual driving trajectory and expected driving trajectory of the surrounding vehicle or a cumulative addition of trajectory errors; and output, to the passenger, a warning corresponding to the third level through the output unit if, as a result of the execution of the diagnosis, it is determined that the autonomous driving control over the ego vehicle is unreliable;

determine that the autonomous driving control over the ego vehicle is unreliable when the state in which the size of the trajectory error is equal to or greater than a preset first threshold value occurs within a preset first critical time period;

additionally perform the diagnosis of reliability using the cumulative addition of the trajectory errors in the state in which the size of the trajectory error is less than the first threshold value for the first critical time period; and determine that the autonomous driving control over the ego vehicle is unreliable, when the state in which the cumulative addition of the trajectory errors is equal to or greater than a preset second threshold value occurs within a second critical time period preset as a value greater than the first critical time period, in the state in which the size of the trajectory error is less than the first threshold value for the first critical time period.

2. The autonomous driving apparatus of claim 1, wherein the processor is configured to:

output, to the passenger, a warning corresponding to the first level through the output unit when the driving mode of the surrounding vehicle is the autonomous driving mode; and output, to the passenger, a warning corresponding to the second level through the output unit when the driving mode of the surrounding vehicle is a manual driving mode.

3. The autonomous driving apparatus of claim 1, wherein the processor is configured to release the warning output through the output unit when the size of the trajectory error becomes less than the first threshold value or the cumulative addition of the trajectory errors becomes less than the second threshold value after outputting the warning to the passenger through the output unit.

4. An autonomous driving method comprising:

controlling, by a processor, autonomous driving of an ego vehicle based on map information stored in a memory;

generating, by the processor, an actual driving trajectory and an expected driving trajectory of a surrounding vehicle around the ego vehicle based on driving information of the surrounding vehicle detected by a sensor unit and the map information stored in the memory, respectively;

determining, by the processor, whether a driving mode of the surrounding vehicle is an autonomous driving mode and an autonomous driving risk of the ego vehicle based on a trajectory error between the actual driving trajectory and expected driving trajectory of the surrounding vehicle, and outputting a warning to a passenger through an output unit at a level corresponding to the determined autonomous driving risk; and after the outputting of the warning, releasing, by the processor, the warning output through the output unit when the state of the passenger detected by the sensor unit is a forward looking state, wherein, in the outputting of the warning, the processor:

outputs the warnings to the passenger through the output unit as first to third levels based on ascending order of autonomous driving risk of the ego vehicle;

performs diagnosis of reliability of autonomous driving control over the ego vehicle based on a size of the trajectory error between the actual driving trajectory and expected driving trajectory of the surrounding vehicle or a cumulative addition of trajectory errors;

outputs, to the passenger, a warning corresponding to the third level through the output unit if, as a result of the execution of the diagnosis, it is determined that the autonomous driving control over the ego vehicle is unreliable;

determines that the autonomous driving control over the ego vehicle is unreliable, when the state in which the size of the trajectory error is equal to or greater than a preset first threshold value occurs within a preset first critical time period; and determines that the autonomous driving control over the ego vehicle is unreliable, when the state in which the cumulative addition of the trajectory errors is equal to or greater than a preset second threshold value occurs within a second critical time period preset as a value greater than the first critical time period, in the state in which the size of the trajectory error is less than the first threshold value for the first critical time period.

5. The autonomous driving method of claim 4, wherein, in the outputting of the warning, the processor:

outputs, to the passenger, a warning corresponding to the first level through the output unit when the driving mode of the surrounding vehicle is the autonomous driving mode; and outputs, to the passenger, a warning corresponding to the second level through the output unit when the driving mode of the surrounding vehicle is a manual driving mode.

6. The autonomous driving method of claim 4, further comprising, after the outputting of the warning, releasing, by the processor, the warning output through the output unit when it is determined that the size of the trajectory error becomes less than the first threshold value or the cumulative addition of the trajectory errors becomes less than the second threshold value.

* * * * *